US012170607B2

(12) United States Patent
Kitamura et al.

(10) Patent No.: US 12,170,607 B2
(45) Date of Patent: Dec. 17, 2024

(54) TRANSMISSION APPARATUS, TRANSMISSION SYSTEM AND DELAY ADJUSTMENT METHOD

(71) Applicant: NIPPON TELEGRAPH AND TELEPHONE CORPORATION, Tokyo (JP)

(72) Inventors: Kei Kitamura, Musashino (JP); Fumikazu Inuzuka, Musashino (JP); Akira Hirano, Musashino (JP); Masahito Tomizawa, Musashino (JP); Takuya Ohara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 664 days.

(21) Appl. No.: 17/292,577

(22) PCT Filed: Nov. 7, 2019

(86) PCT No.: PCT/JP2019/043587
§ 371 (c)(1),
(2) Date: May 10, 2021

(87) PCT Pub. No.: WO2020/100700
PCT Pub. Date: May 22, 2020

(65) Prior Publication Data
US 2022/0006722 A1 Jan. 6, 2022

(30) Foreign Application Priority Data
Nov. 13, 2018 (JP) ................................ 2018-212831

(51) Int. Cl.
*H04L 45/121* (2022.01)
*H04L 45/00* (2022.01)
(Continued)

(52) U.S. Cl.
CPC ............ *H04L 45/121* (2013.01); *H04L 45/22* (2013.01); *H04L 45/24* (2013.01); *H04L 45/28* (2013.01); *H04L 47/30* (2013.01)

(58) Field of Classification Search
CPC ......... H04L 45/00; H04L 47/00; H04L 49/00; H04J 2203/00
See application file for complete search history.

(56) References Cited

U.S. PATENT DOCUMENTS

| 5,285,441 A * | 2/1994 | Bansal ............... H04Q 11/0478 370/517 |
| 2008/0232245 A1* | 9/2008 | Furukawa .................. G06F 8/65 370/221 |
| 2016/0164760 A1* | 6/2016 | Wakabayashi ...... H04L 43/0858 370/252 |

FOREIGN PATENT DOCUMENTS

JP 2008048213 A * 2/2008

OTHER PUBLICATIONS

H. Sato et al., Implementation of a Hit-less Protection Switching LSI for 150M/600Mbps ATM Transmission Lines, IEICE Technical Report, vol. 96, No. 4, 1996.

* cited by examiner

*Primary Examiner* — Derrick W Ferris
*Assistant Examiner* — Sumitra Ganguly

(57) ABSTRACT

A transmission apparatus performs communication with a transmission side transmission apparatus via a transmission path of an active system and a transmission path of a standby system. The transmission apparatus includes: a memory configured to have a capacity that is as large as delay caused due to a maximum path difference between the transmission path of the active system and the transmission path of the standby system is allowable; and a memory connection control unit configured to switch connection of the memory (Continued)

and cause a signal of the transmission path of the active system or the transmission path of the standby system to be accumulated in the memory.

4 Claims, 10 Drawing Sheets

(51) Int. Cl.
*H04L 45/24* (2022.01)
*H04L 45/28* (2022.01)
*H04L 47/30* (2022.01)

TRANSMISSION APPARATUS, TRANSMISSION SYSTEM AND DELAY ADJUSTMENT METHOD

CROSS-REFERENCE TO RELATED APPLICATIONS

This application is a 371 U.S. National Phase of International Application No. PCT/JP2019/043587 filed on Nov. 7, 2019, which claims priority to Japanese Application No. 2018-212831 filed on Nov. 13, 2018. The entire disclosures of the above applications are incorporated herein by reference.

TECHNICAL FIELD

The present invention relates to a transmission apparatus, a transmission system and a delay adjustment method.

BACKGROUND ART

In the related art, to provide a network service with high reliability, a synchronous digital hierarchy (SDH) includes a protection function of performing path switching without bit drop at the time of fault transfer or circuit interruption. The path switching function includes a function of duplicating a signal in a transmission side transmission device and transmitting the signal to each of a transmission path of an active system (hereinafter referred to as a "0-system transmission path") and a transmission path of a standby system (hereinafter referred to as a "1-system transmission path") and a function of compensating for a path difference between the 0-system transmission path and the 1-system transmission path in a reception side transmission device and then switching between the 0-system transmission path and the 1-system transmission path. The reception side transmission device performs signal switching between the 0-system transmission path and the 1-system transmission path using an instruction from an operator, signal interruption, or the like as a path switching trigger.

PTL 1 discloses a device that realizes uninterrupted switching between transmission paths while inhibiting delay in a transmission system in which a transmission side transmission device and a reception side transmission device are connected via a 0-system transmission path and a 1-system transmission path. In general, because a length of the 0-system transmission path differs from a length of the 1-system transmission path, it is necessary to perform delay adjustment using a data buffer memory to achieve uninterrupted switching. The transmission device disclosed in PTL 1 includes a plurality of memories that accumulate signals received from each of the 0-system transmission path and the 1-system transmission path and performs delay adjustment by postponing a timing at which a signal is read from a memory and adding a delay to the signal or advancing the timing at which the signal is read to delete the delay.

CITATION LIST

Patent Literature

[PTL 1] Japanese Patent Application Publication No. 2008-48213

SUMMARY OF THE INVENTION

Technical Problem

In the transmission device disclosed in PTL 1, however, a delay difference adjustment unit necessarily includes a large-capacity memory that buffers data to achieve delay adjustment in each of the 0-system transmission path and the 1-system transmission path. Because the large-capacity memory is expensive, there is a problem that the cost of the device is expensive.

In view of the foregoing circumstances, an objective of the present invention is to provide a technique for reducing the cost of a device.

Means for Solving the Problem

According to an aspect of the present invention, a transmission apparatus that communicates with a transmission side transmission apparatus via a transmission path of an active system and a transmission path of a standby system includes: a memory configured to have a capacity that is as large as allowable delay caused due to a maximum path difference between the transmission path of the active system and the transmission path of the standby system; and a memory connection control unit configured to switch connection of the memory and cause a signal of the transmission path of the active system or the transmission path of the standby system to accumulate in the memory.

In the transmission apparatus according to the aspect of the present invention, the memory connection control unit may cause a signal of the transmission path of the active system or the transmission path of the standby system in which delay is less to accumulate in the memory.

The transmission apparatus according to the aspect of the present invention may further include a path selection unit configured to select a path of a signal acquisition source between the transmission path of the active system and the transmission path of the standby system. The memory connection control unit may disconnect the connection of the memory while waiting for communication in one transmission path between the transmission path of the active system and the transmission path of the standby system and may reconnect the memory to accumulate a signal of the transmission path of the active system or the transmission path of the standby system in which delay is less after the communication is recovered. The path selection unit may switch the path of the signal acquisition source to the selected path after the memory is connected.

According to another aspect of the present invention, a transmission system includes: a transmission apparatus configured to perform communication with a transmission side transmission apparatus via a transmission path of an active system and a transmission path of a standby system; and a control system configured to control the transmission apparatus. The transmission apparatus includes a memory that has a capacity that is as large as allowable delay caused due to a maximum path difference between the transmission path of the active system and the transmission path of the standby system, and a memory connection control unit that switches connection of the memory in response to an instruction from the control system and causes a signal of the transmission path of the active system or the transmission path of the standby system to accumulate in the memory. The control system includes a control unit that gives an instruction of a connection destination of the memory to the memory connection control unit.

According to still another aspect of the present invention, there is provided a delay adjustment method in a transmission apparatus that performs communication with a transmission side transmission apparatus via a transmission path of an active system and a transmission path of a standby system. The method includes a memory connection control step of switching connection of a memory that has a capacity that is as large as allowable delay caused due to a maximum path difference between the transmission path of the active system and the transmission path of the standby system to accumulate a signal of the transmission path of the active system or the transmission path of the standby system in the memory.

Effects of the Invention

According to the present invention, it is possible to reduce the cost of the device.

DESCRIPTION OF EMBODIMENTS

Hereinafter, an embodiment of the present invention will be described with reference to the drawings.

First Embodiment

Figure 1:
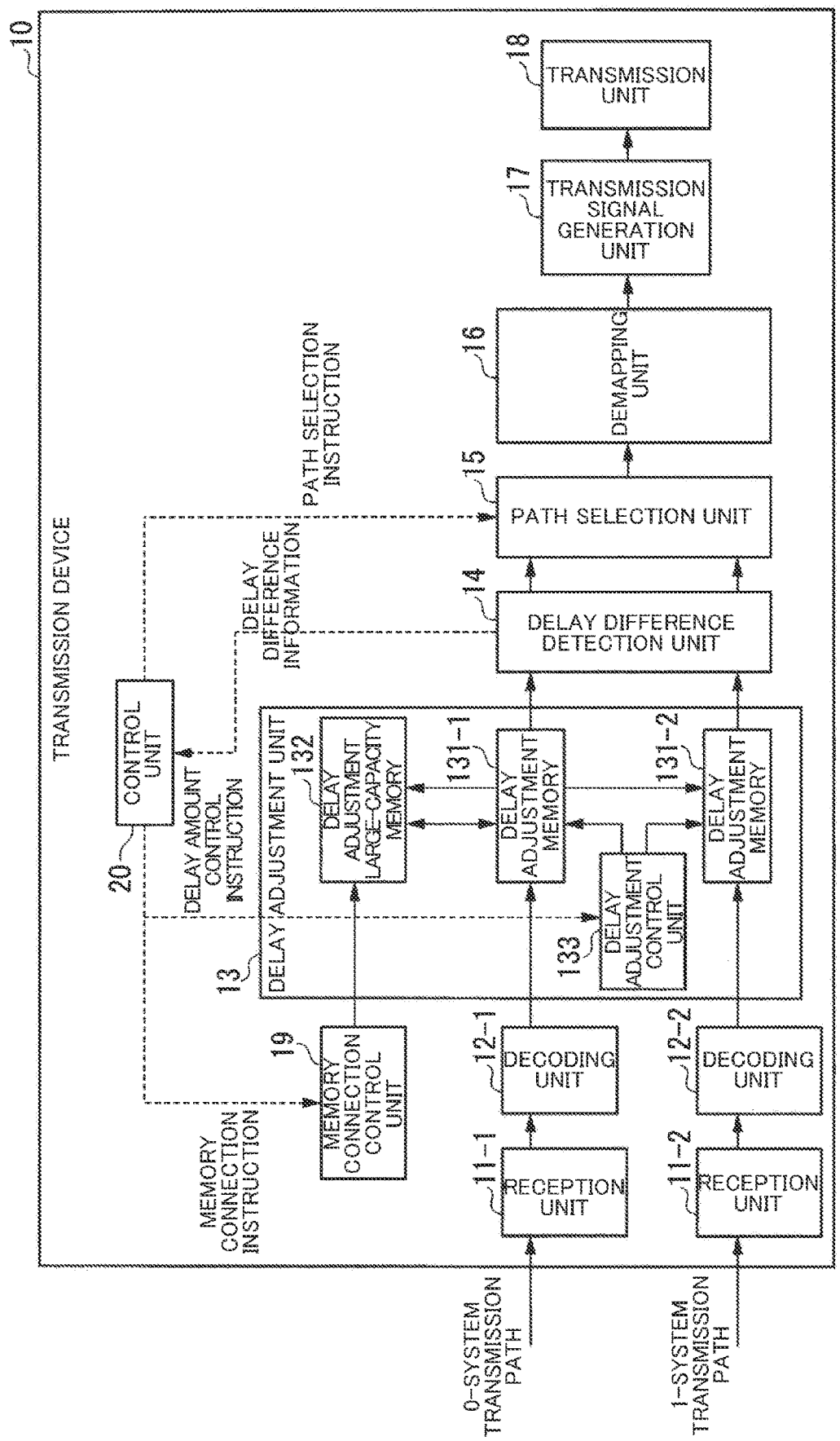
FIG. 1 is a block diagram illustrating a functional configuration of a transmission device according to a first embodiment.

FIG. 1 is a block diagram illustrating a functional configuration of a transmission device (a transmission apparatus) 10 according to a first embodiment.

The transmission device 10 according to the first embodiment receives a plurality of signals transmitted via a 0-system transmission path and a 1-system transmission path from a transmission side transmission device (a transmission side transmission apparatus) and transmits signals received via any transmission path among the plurality of received signals to another device.

The transmission device 10 includes reception units 11-1 and 11-2, decoding units 12-1 and 12-2, a delay adjustment unit 13, a delay difference detection unit 14, a path selection unit (a path selector)_15, a demapping unit 16, a transmission signal generation unit 17, a transmission unit 18, a memory connection control unit (a memory connection controller) 19, and a control unit 20.

The reception unit 11-1 is an interface that receives a signal from the 0-system transmission path.

The reception unit 11-2 is an interface that receives a signal from the 1-system transmission path.

The decoding unit 12-1 decodes an OTU frame from the received electrical signal, establishes frame synchronization, and then outputs a decoded OTU frame to the delay adjustment unit 13. The OTU frame may be any of an optical-channel transport unit (OTU) 1, an OTU 2, an OTU 3, and an OTU 4.

The decoding unit 12-2 decodes an OTU frame from the received electrical signal, establishes frame synchronization, and then outputs a decoded OTU frame to the delay adjustment unit 13.

The delay adjustment unit 13 adjusts delay between the 0-system transmission path and the 1-system transmission path. Specifically, the delay adjustment unit 13 adjusts an output of the same signal received via the 0-system transmission path and the 1-system transmission path in response to an instruction from the control unit 20. For example, the delay adjustment unit 13 adjusts the delay by adjusting a reading speed of the memory. The delay adjustment unit 13 performs adjustment until the delay difference between the 0-system transmission path and the 1-system transmission path disappears. The delay adjustment unit 13 includes delay adjustment memories 131-1 and 131-2, a delay adjustment large-capacity memory 132, and a delay adjustment control unit 133.

The delay adjustment memory 131-1 accumulates the OTU frame output from the decoding unit 12-1 and outputs the OTU frame in conformity with a first in first out (FIFO) scheme. The delay adjustment memory 131-1 is a memory that has a small capacity and is, for example, a memory that does not have a capacity that is as large as a maximum adjustable path difference (delay difference) between the 0-system transmission path and the 1-system transmission path.

The delay adjustment memory 131-2 accumulates the OTU frame output from the decoding unit 12-2 and outputs the OTU frame in conformity with a first in first out (FIFO) scheme. The delay adjustment memory 131-2 is a memory that has a small capacity and is, for example, a memory that does not have a capacity that is as large as allowable delay caused due to the maximum path difference (delay difference) between the 0-system transmission path and the 1-system transmission path. The capacity that is as large as allowable delay caused due to the maximum path difference (delay difference) between the 0-system transmission path and the 1-system transmission path is a capacity in which it is possible to accumulate all the data generated until the delay caused due to the maximum delay difference (delay difference) between the 0-system transmission path and the 1-system transmission path disappears.

In the following description, when the delay adjustment memories 131-1 and 131-2 are not particularly distinguished from each other, the delay adjustment memories 131-1 and 131-2 are referred to as the delay adjustment memories 131.

The delay adjustment large-capacity memory 132 accumulates the OTU frame output from the decoding unit 12-1 or 12-2. The delay adjustment large-capacity memory 132 is an auxiliary memory that accumulates a signal which cannot be accumulated due to capacity shortage in the delay adjustment memories 131-1 and 131-2. The delay adjustment large-capacity memory 132 is a memory that has a capacity that is as large as allowable delay caused due to the maximum difference (delay difference) between the 0-system transmission path and the 1-system transmission path.

The delay adjustment large-capacity memory 132 can be switched with the delay adjustment memories 131-1 and 131-2 from the viewpoint of physical connection. For example, a connection destination of the delay adjustment large-capacity memory 132 may be switched under the control of the memory connection control unit 19, the connection destination thereof may be switched by a switch, or the connection destination thereof may be switched physically by an operator. The delay adjustment large-capacity memory 132 can be connected to any one of the delay adjustment memories 131-1 and 131-2 at the time of use and is not connected to the other memory. The delay adjustment large-capacity memory 132 may be a memory in a chip or may be an externally attached memory other than a chip.

The delay adjustment control unit 133 performs delay adjustment by postponing a timing at which signals are read from the delay adjustment memories 131-1 and 131-2 to add delay to the signals or advancing the timing at which the signals are read to delete the delay in response to a delay amount control instruction notified of by the control unit 20. The delay amount control instruction is a notification for giving an instruction to perform delay adjustment. The delay amount control instruction includes, for example, information regarding a delay difference between the 0-system transmission path and the 1-system transmission path.

The delay adjustment control unit 133 reads signals from the delay adjustment memory 131-1 or 131-2 to which the delay adjustment large-capacity memory 132 is connected. Thereafter, the delay adjustment control unit 133 instructs the delay adjustment memory 131-1 or 131-2 to accumulate signals accumulated in the delay adjustment large-capacity memory 132 in the own memory. The delay adjustment control unit 133 may directly read signals from the delay adjustment large-capacity memory 132 and may accumulate the signals in the delay adjustment memory 131-1 or 131-2 to which the delay adjustment large-capacity memory 132 is connected. The delay adjustment control unit 133 accumulates signals in the delay adjustment large-capacity memory 132 when signals cannot be accumulated due to shortage of the capacity of the delay adjustment memory 131-1 or 131-2 to which the delay adjustment large-capacity memory 132 is connected or the capacity of the delay adjustment memory 131-1 or 131-2 is likely to be short. The delay adjustment control unit 133 may directly accumulate signals in the delay adjustment large-capacity memory 132 without accumulating the signals in the delay adjustment memory 131-1 or 131-2 to which the delay adjustment large-capacity memory 132 is connected.

The delay difference detection unit 14 calculates a delay difference between the 0-system transmission path and the 1-system transmission path based on the OTU frame accumulated in the delay adjustment memories 131-1 and 131-2. The delay difference detection unit 14 outputs information including a value of the calculated delay difference (hereinafter referred to as "delay difference information") to the control unit 20 and outputs the OTU frame to the path selection unit 15. The delay difference detection unit 14 and the path selection unit 15 are connected via two paths, that is, first and second paths. The first path is a path along which the OTU frame accumulated in the delay adjustment memory 131-1 is output, that is, a path corresponding to the 0-system transmission path. The second path is a path along which the OTU frame accumulated in the delay adjustment memory 131-2 is output, that is, a path corresponding to the 1-system transmission path.

The path selection unit 15 selects a path of a signal acquisition source in accordance with a path selection instruction notified of by the control unit 20. The path selection instruction is an instruction to select a signal acquisition path. The path selection instruction includes, for example, information for designating one of the 0-system transmission path and the 1-system transmission path. The path selection unit 15 selects the first path when the information for designating the 0-system transmission path is included in the path selection instruction. The path selection unit 15 selects the second path when the information for designating the 1-system transmission path is included in the path selection instruction. For example, the path selection unit 15 is a switch and outputs the OTU frame output from the selected path to the demapping unit 16 by switching connection to the selected path in response to an instruction from the control unit 20.

The demapping unit 16 decodes a client signal by performing overhead (OH) termination processing in the OTU frame output from the path selection unit 15. For example, when a kind of OTU frame is OTU4, the demapping unit 16 decodes a 100 GE client signal from a payload of the OTU frame.

The transmission signal generation unit 17 generates a transmission signal by performing OH insertion processing on the client signal decoded by the demapping unit 16 and then converting the client signal into a transmission electrical signal.

The transmission unit 18 transmits the transmission signal to the outside of the transmission device 10 by performing electrical-optical conversion on the transmission signal generated by the transmission signal generation unit 17.

The memory connection control unit 19 controls a connection destination of the delay adjustment large-capacity memory 132 in response to a memory connection instruction notified of by the control unit 20. More specifically, the memory connection control unit 19 switches the physical connection of the delay adjustment large-capacity memory 132 and accumulates a signal of one of the 0-system transmission path and the 1-system transmission path in the delay adjustment large-capacity memory 132. The memory connection instruction is an instruction regarding connection of the delay adjustment large-capacity memory 132. For example, the memory connection instruction includes information for designating the delay adjustment memory 131 in a path for which the delay adjustment is necessary. The path for which the delay adjustment is necessary is a transmission path along which the same signal is received earlier. The information for designating the delay adjustment memory 131 may be, for example, identification information of the delay adjustment memory 131 or may be the name of the delay adjustment memory 131.

The control unit 20 controls each functional unit of the transmission device 10. For example, the control unit 20 determines a transmission path along which the same signal is received earlier based on the delay difference information obtained from the delay difference detection unit 14. That is, the control unit 20 determines whether the signal is received earlier between the 0-system transmission path and the 1-system transmission path.

For example, the control unit 20 generates a memory connection instruction based on a determination result obtained from the delay difference information. For example, the control unit 20 generates a delay amount control instruction based on the delay difference information. For example, the control unit 20 generates a path selection instruction based on the delay difference information or failure information indicating a failure of the path. In the present specification, the failure includes not only a general failure occurring unexpectedly but also an event or the like in which the transmission path is disconnected due to planned transmission path construction.

The failure information may be input from the delay difference detection unit 14 or an external communication device operated by an operator. When the delay difference detection unit 14 outputs the failure information and a signal from a transmission path of a certain system cannot be acquired for a given time, the delay difference detection unit 14 may determine that the system fails and output the failure information to the control unit 20. The control unit 20 may acquire the failure information from information indicating abnormality of an optical signal detected by the reception unit 11-1 or information regarding OTN-OH (OTU-OH, ODU-OH, or OPU-OH) decoded by the decoding unit 12-1.

Figure 2:
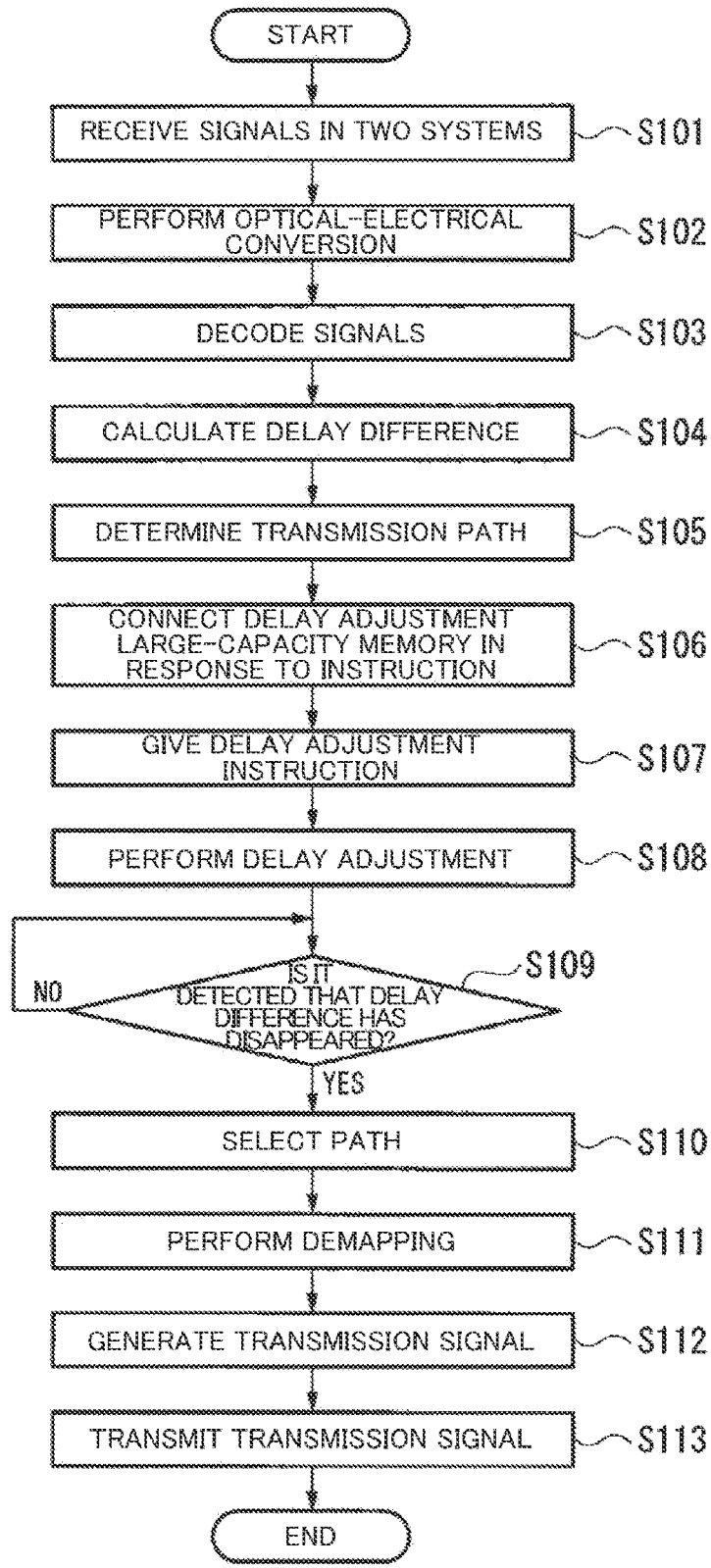
FIG. 2 is a flowchart illustrating a flow of processing of the transmission device according to the first embodiment.

FIG. 2 is a flowchart illustrating a flow of processing of the transmission device 10 according to the first embodiment. When the processing of FIG. 2 starts, the delay adjustment large-capacity memory 132 is assumed not to be connected to one of the delay adjustment memories 131-1 and 131-2.

The transmission device 10 receives signals in two systems (step S101). Specifically, the reception unit 11-1 receives a signal from the 0-system transmission path. The reception unit 11-2 receives a signal from the 1-system transmission path. The reception unit 11-1 performs optical-electrical conversion on the received signal and outputs the signal subjected to the optical-electrical conversion to the decoding unit 12-1. The reception unit 11-2 performs optical-electrical conversion on the received signal and outputs the signal subjected to the optical-electrical conversion to the decoding unit 12-2 (step S102).

The decoding unit 12-1 decodes the OTU frame from the received electrical signal. The decoding unit 12-1 establishes frame synchronization and then accumulates the decoded OTU frame to the delay adjustment memory 131-1. The decoding unit 12-2 decodes the OTU frame from the received electrical signal (step S103). The decoding unit 12-2 establishes frame synchronization and then accumulates the decoded OTU frame to the delay adjustment memory 131-2.

The delay difference detection unit 14 calculates a delay difference between the 0-system transmission path and the 1-system transmission path based on the OTU frames accumulated in the delay adjustment memories 131-1 and 131-2 (step S104). Specifically, the delay difference detection unit 14 acquires the OTU frame accumulated in the delay adjustment memory 131-1 and the OTU frame accumulated in the delay adjustment memory 131-2. The delay difference detection unit 14 detects MFAS from each of the acquired OTU frames and establishes MFAS synchronization. Subsequently, the delay difference detection unit 14 calculates a delay difference by comparing a value of the MFAS in the OTU frame acquired from the delay adjustment memory 131-1 with a value of the MFAS in the OTU frame acquired from the delay adjustment memory 131-2.

When there is a lack in the calculation of the delay difference by only the counter using the MFAS values, the delay difference detection unit 14 may define and use any area of OH of an optical transport network (OTN) frame as an extended MFAS. The delay difference detection unit 14 outputs information regarding the calculated delay difference to the control unit 20 and outputs the OTU frames to the path selection unit 15. The delay difference detection unit 14 may check the received data identity by comparing trial trace identifiers (TTIs) in the OTU frame acquired from the delay adjustment memory 131-1 and the OTU frame acquired from the delay adjustment memory 131-2.

The control unit 20 determines the transmission path along which the same signal is received earlier based on the information regarding the delay difference output from the delay difference detection unit 14 (step S105). The control unit 20 generates a memory connection instruction in accordance with a determination result and outputs the generated memory connection instruction to the memory connection control unit 19.

For example, when the control unit 20 determines that the signal of the 0-system transmission path is received earlier than the signal of the 1-system transmission path, the control unit 20 generates a memory connection instruction including an instruction to connect the delay adjustment large-capacity memory 132 to the delay adjustment memory 131 accumulating the signal received from the 0-system transmission path, that is, the delay adjustment memory 131-1. The control unit 20 outputs the generated memory connection instruction to the memory connection control unit 19.

For example, when the control unit 20 determines that the signal of the 1-system transmission path is received earlier than the signal of the 0-system transmission path, the control unit 20 generates a memory connection instruction including an instruction to connect the delay adjustment large-capacity memory 132 to the delay adjustment memory 131 accumulating the signal received from the 1-system transmission path, that is, the delay adjustment memory 131-2. The control unit 20 outputs the generated memory connection instruction to the memory connection control unit 19.

The memory connection control unit 19 connects the delay adjustment large-capacity memory 132 to the delay adjustment memory 131-1 or the delay adjustment memory 131-2 in response to the memory connection instruction output from the control unit 20 (step S106). For example, the memory connection control unit 19 connects the delay adjustment large-capacity memory 132 to the delay adjustment memory 131-1 when the memory connection instruction includes the instruction to connect the delay adjustment large-capacity memory 132 to the delay adjustment memory 131-1. For example, the memory connection control unit 19 connects the delay adjustment large-capacity memory 132 to the delay adjustment memory 131-2 when the memory connection instruction includes the instruction to connect the delay adjustment large-capacity memory 132 to the delay adjustment memory 131-2.

When the connection between the delay adjustment memory 131 and the delay adjustment large-capacity memory 132 is completed, the memory connection control unit 19 responds to the control unit 20 with the connection of the delay adjustment large-capacity memory 132. After receiving the response indicating the connection of the delay adjustment large-capacity memory 132, the control unit 20 generates a delay amount control instruction and outputs the generated delay amount control instruction to the delay adjustment control unit 133 (step S107).

The delay adjustment control unit 133 performs the delay adjustment, for example, by adjusting a reading speed of the memory in response to the delay amount control instruction output from the control unit 20 (step S108). The delay difference detection unit 14 determines whether it is detected that the delay difference has disappeared (step S109).

When it is detected that the delay difference has disappeared (YES in step S109), the delay difference detection unit 14 notifies the control unit 20 that the delay difference has disappeared.

Conversely, when it is not detected that the delay difference has disappeared (NO in step S109), the delay difference detection unit 14 waits until it is detected that the delay difference has disappeared.

When the delay difference detection unit 14 notifies the control unit 20 that the delay difference has disappeared, the control unit 20 outputs an instruction to end the delay adjustment to the delay adjustment control unit 133. Thus, the delay adjustment control unit 133 ends the delay adjustment. After the delay difference has disappeared, the control unit 20 outputs a path selection instruction to the path selection unit 15. For example, the control unit 20 generates the path selection instruction including information indicating that the delay is less, that is, designating the transmission path in which the signal is received earlier, and outputs the generated path selection instruction to the path selection unit 15. When the delay difference detection unit 14 inputs failure information or the operator inputs failure information from an external communication device, the control unit 20 generates a path selection instruction including information designating a transmission path different from the transmission path indicated by the failure information and outputs the generated path selection instruction to the path selection unit 15.

The path selection unit 15 selects the path of the signal acquisition source in response to the path selection instruction (step S110). For example, when the path selection instruction includes information designating the 0-system transmission path and the connection to the path (the first path) of the 0-system transmission path is made at the time of acquisition of the path selection instruction, the path selection unit 15 selects the first path and does not perform an operation of switching the connection or the like. In this way, when the path designated by the path selection instruction is the same as the path connected at the time of acquisition of the path selection instruction, the path selection unit 15 does not switch the path.

Conversely, when the path selection instruction includes information designating the 0-system transmission path and the connection to the path (the second path) of the 1-system transmission path is made at the time of acquisition of the path selection instruction, the path selection unit 15 selects the first path and performs an operation of switching the connection destination from the second path to the first path. In this way, when the path designated by the path selection instruction differs from the path connected at the time of acquisition of the path selection instruction, the path selection unit 15 switches the path.

Through the foregoing processing, the OTU frames are output to the demapping unit 16 from the path to which the path selection unit 15 and the delay difference detection unit 14 are connected. The demapping unit 16 performs the OH termination processing on the OTU frames output from the path selection unit 15, and then decodes predetermined client signals (for example, 100 GE client signals) from the payloads (step S111). The demapping unit 16 outputs the decoded client signals to the transmission signal generation unit 17.

The transmission signal generation unit 17 performs the OH insertion processing on the client signals decoded by the demapping unit 16, and then generates transmission signals by converting the client signals into transmission electrical signals (step S112). The transmission signal generation unit 17 outputs the generated transmission signals.

The transmission unit 18 performs electrical-optical conversion on the transmission signals generated by the transmission signal generation unit 17, and then transmits the converted transmission signals to the outside of the transmission device 10 (step S113).

The transmission device 10 that has the foregoing configuration switches the connection of the delay adjustment large-capacity memory 132 based on the delay difference between the 0-system transmission path and the 1-system transmission path. For example, the transmission device 10 performs control such that the delay adjustment large-capacity memory 132 is connected to the delay adjustment memory 131 of the transmission path in which the delay adjustment is necessary, that is, the transmission path in which the same signal is received earlier. Thus, it is possible to include and share one large-capacity memory that has a capacity that is as large as the delay caused due to the maximum path difference (the delay difference) between the 0-system transmission path and the 1-system transmission path can be adjusted. Accordingly, it is not necessary to include such a large-capacity memory for each transmission path. Therefore, it is possible to reduce a total memory capacity. As a result, it is possible to reduce the cost of the device.

Second Embodiment

A second embodiment is an embodiment in which a problem is solved when connection is switched to the transmission path used before switching of the path (hereinafter referred to as "switching-back of the path") from a situation in which communication is performed via one transmission path between the 0-system transmission path and the 1-system transmission path after the switching of the path. That is, the second embodiment is an embodiment in which the problem is solved when connection is switched to the 1-system transmission path which is a transmission path used before the switching of the path in a case where the communication is performed via the 0-system transmission path after the switching of the path, and the connection is switched to the 0-system transmission path which is a transmission path used before the switching of the path in a case where the communication is performed via the 1-system transmission path after the switching of the path.

First, the problem will be described before the second embodiment is described. When the problem is described, the following situation will be assumed in the description after the path is switched in the first embodiment.

When the communication cannot be performed due to a failure of the 0-system transmission path, that is, while waiting for the communication via the 0-system transmission path, the delay adjustment large-capacity memory 132 switches the path connected to the delay adjustment memory 131-1 from the 0-system transmission path to the 1-system transmission path to perform the communication via the 1-system transmission path.

When the communication via the 0-system transmission path is restored, a delay amount of the 0-system transmission path is greater than a delay amount of the 1-system transmission path due to restoring work such as a path extension or an introduction of a new device in the inside of the path (the delay amount of the 0-system transmission path>the delay amount of the 1-system transmission path).

In the case of the foregoing situation, when the path selection unit 15 attempts to switch the path back from the 1-system transmission path to the 0-system transmission path in a state in which the delay adjustment large-capacity memory 132 is connected to the delay adjustment memory 131-1 via the 0-system transmission path, data may be discarded due to a lack of the memory capacity in the delay adjustment memory 131-2 via the 1-system transmission path at the time of performing the delay adjustment. Accordingly, in the second embodiment, a method of avoiding this problem will be described.

Figure 3:
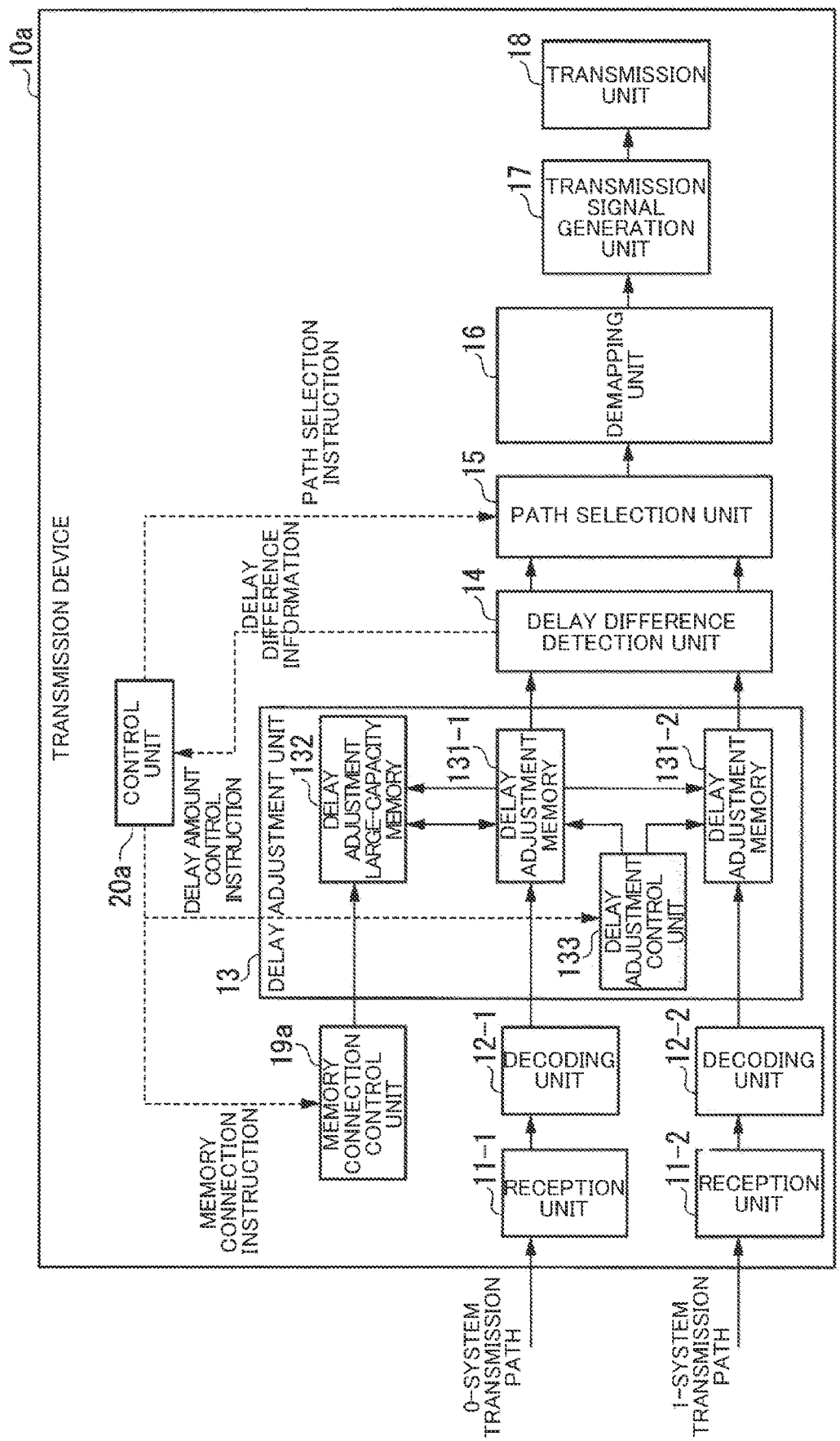
FIG. 3 is a block diagram illustrating a functional configuration of a transmission device according to a second embodiment.

FIG. 3 is a block diagram illustrating a functional configuration of a transmission device 10a according to the second embodiment.

The transmission device 10a according to the second embodiment performs processing similar to the processing of the transmission device 10. The transmission device 10a performs the switching-back of the path at a predetermined timing after performing the path switching. The predetermined timing is, for example, a timing at which the communication via the path during a failure is restored or a timing at which an operator gives an instruction.

The transmission device 10a includes the reception units 11-1 and 11-2, the decoding units 12-1 and 12-2, the delay adjustment unit 13, the delay difference detection unit 14, the path selection unit 15, the demapping unit 16, the transmission signal generation unit 17, the transmission unit 18, a memory connection control unit 19a, and a control unit 20a.

The transmission device 10a has a different configuration from the transmission device 10 in that the memory connection control unit 19a and the control unit 20a are included instead of the memory connection control unit 19 and the control unit 20. The transmission device 10a is similar to the transmission device 10 in other configurations. Therefore, the description of the entire transmission device 10a will be omitted and the memory connection control unit 19a and the control unit 20a will be described.

The memory connection control unit 19a performs processing similar to the processing of the memory connection control unit 19. The memory connection control unit 19a disconnects the connection of the delay adjustment large-capacity memory 132 connected to the delay adjustment memory 131 after the path switching is performed. Specifically, the memory connection control unit 19a physically disconnects the connection between the delay adjustment memory 131 and the delay adjustment large-capacity memory 132.

The control unit 20a performs processing similar to the processing of the control unit 20. The control unit 20a outputs a memory connection instruction including an instruction to release the connection of the delay adjustment large-capacity memory 132 to the memory connection control unit 19a after the path switching is performed, that is, after the path is switched by the path selection unit 15. The control unit 20a outputs a path selection instruction including an instruction to connect to the path used before the switching to the path selection unit 15 after the delay difference disappears because of delay adjustment.

Figure 4:
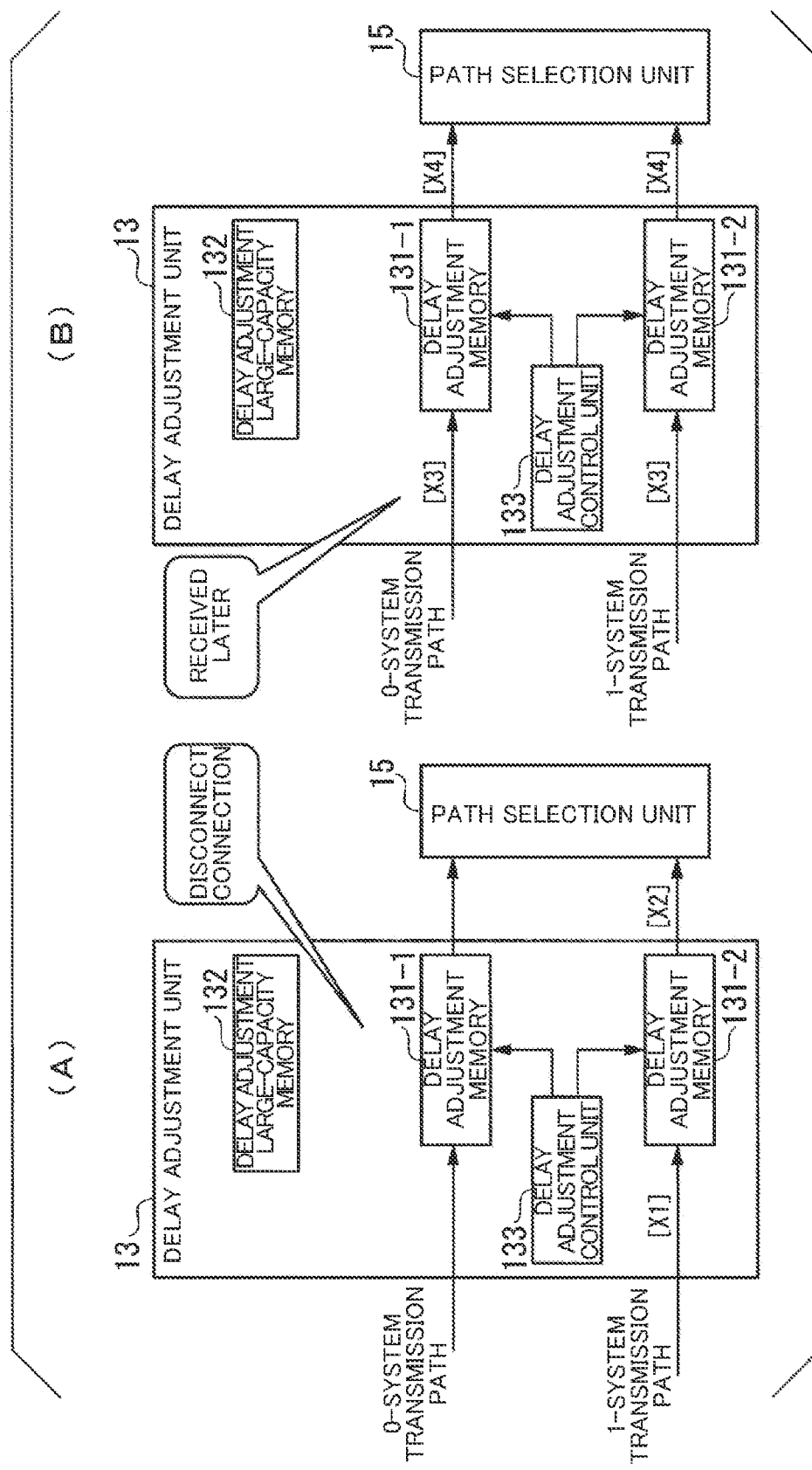
FIG. 4 is a set of diagrams illustrating processing of the transmission device according to the second embodiment.
Figure 5:
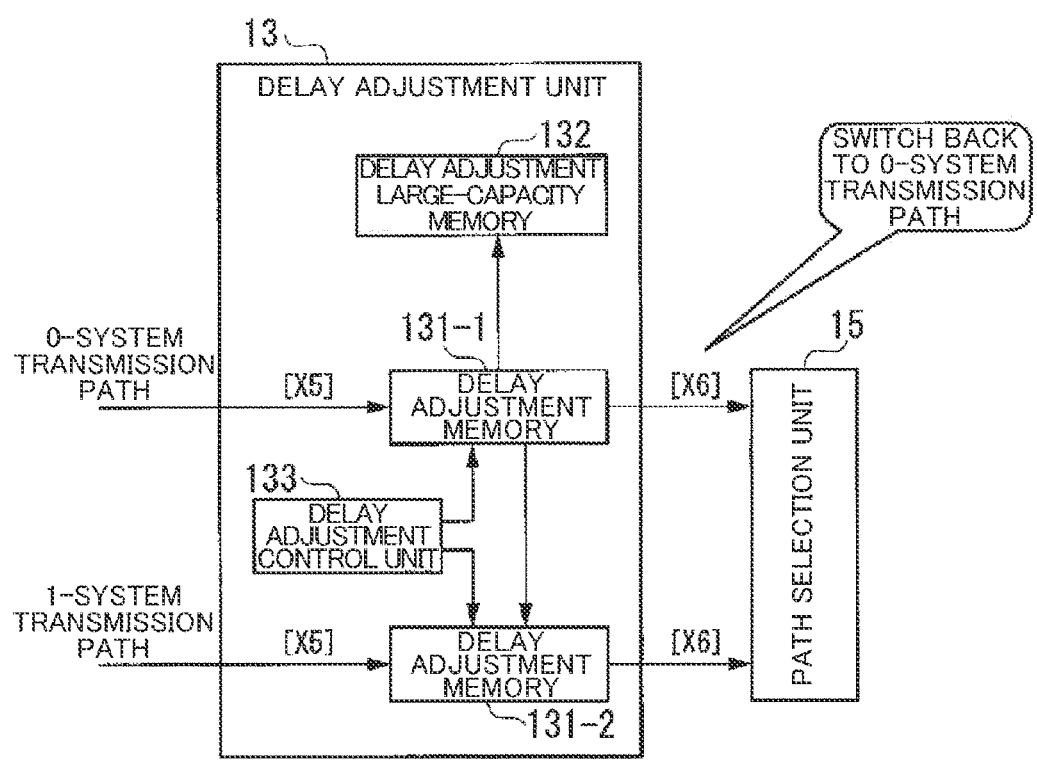
FIG. 5 is a diagram illustrating processing of the transmission device according to the second embodiment.

FIGS. 4 and 5 are diagrams illustrating processing of the transmission device 10a according to the second embodiment.

In the foregoing transmission device 10a, as illustrated in FIG. 4(A), the memory connection control unit 19a disconnects the connection between the delay adjustment memory 131-1 and the delay adjustment large-capacity memory 132 in the 0-system transmission path in response to an instruction from the control unit 20a when communication is not performed due to an influence of a failure or the like of the 0-system transmission path, the 0-system transmission path is being restored, and communication is performed via only the 1-system transmission path.

In the foregoing transmission device 10a, thereafter, as illustrated in FIG. 4(B), after the 0-system transmission path is restored and the communication is restored, the delay difference detection unit 14 calculates a delay difference by comparing a value of MFAS in the OTU frame acquired from the delay adjustment memory 131-1 with a value of MFAS in the OTU frame acquired from the delay adjustment memory 131-2. Here, when a signal of the 0-system transmission path is received later than a signal of the 1-system transmission path with regard to the same signal, as illustrated in FIG. 5, the memory connection control unit 19a reconnects the delay adjustment large-capacity memory 132 to the delay adjustment memory 131-2 via the 1-system transmission path which is the transmission path in which delay is less. In the foregoing transmission device 10a, the delay difference detection unit 14 performs delay adjustment to remove the delay difference, and then the path selection unit 15 switches the path back from the 1-system transmission path to the 0-system transmission path.

Figure 6:
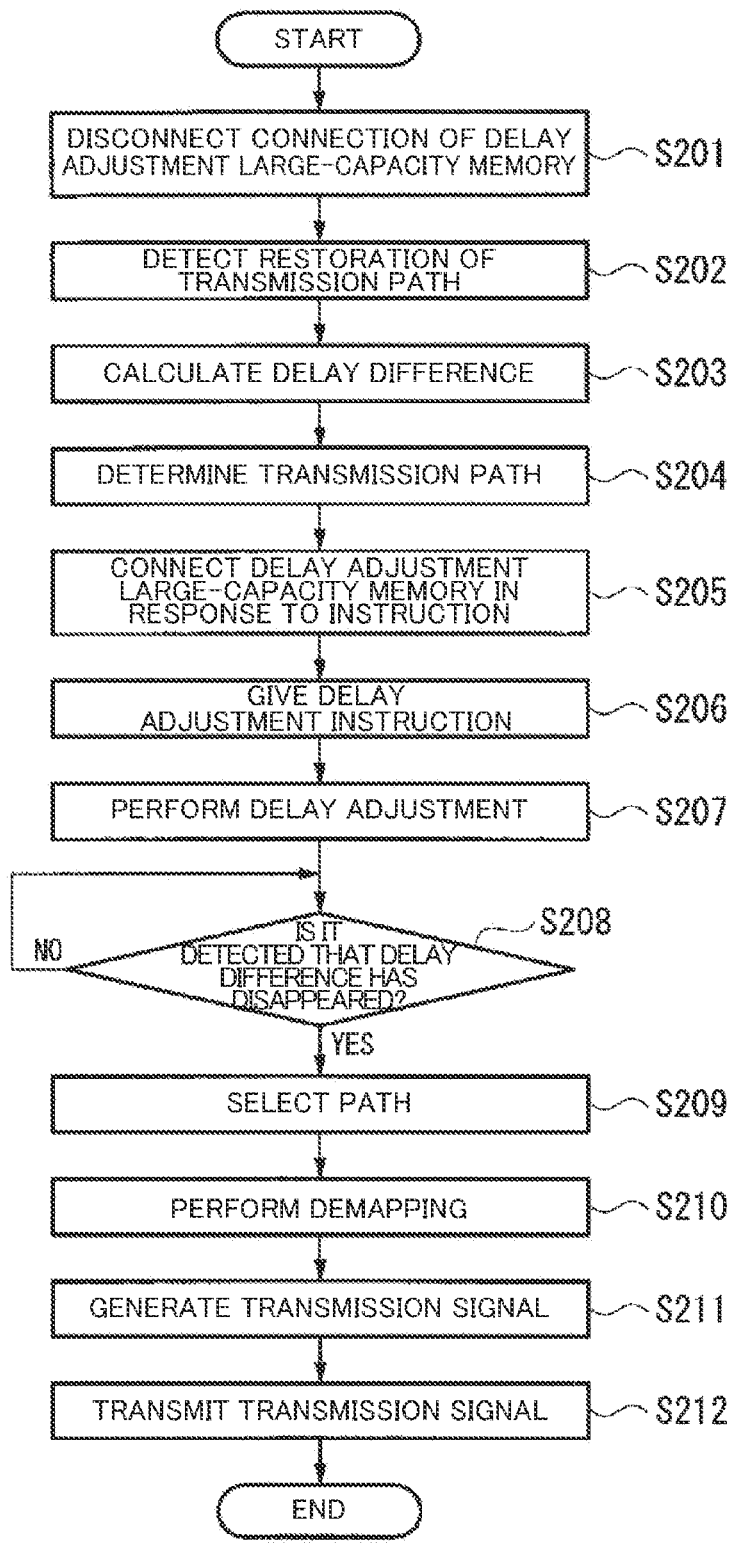
FIG. 6 is a flowchart illustrating a flow of processing of the transmission device according to the second embodiment.

FIG. 6 is a flowchart illustrating a flow of processing of the transmission device 10a according to the second embodiment. The processing of FIG. 6 is performed after the path selection unit 15 switches the path.

After the path selection unit 15 switches the path, the control unit 20a generates a memory connection instruction including the instruction to release the connection of the delay adjustment large-capacity memory 132. The control unit 20a outputs the generated memory connection instruction to the memory connection control unit 19a. The memory connection control unit 19a disconnects the connection between the delay adjustment memory 131 and the delay adjustment large-capacity memory 132 in response to the memory connection instruction output from the control unit 20a (step S201).

For example, the memory connection control unit 19a disconnects the connection between the delay adjustment memory 131-1 and the delay adjustment large-capacity memory 132 when the delay adjustment memory 131-1 and the delay adjustment large-capacity memory 132 are connected.

For example, the memory connection control unit 19a disconnects the connection between the delay adjustment memory 131-2 and the delay adjustment large-capacity memory 132 when the delay adjustment memory 131-2 and the delay adjustment large-capacity memory 132 are connected.

Thus, the delay adjustment large-capacity memory 132 is not connected to either of the delay adjustment memories 131-1 and 131-2.

The control unit 20a detects the restoration of the transmission path in response to a notification indicating failure restoration from the delay difference detection unit 14 or a switching-back instruction from the operator (step S202). The delay difference detection unit 14 calculates a delay difference between the 0-system transmission path and the 1-system transmission path based on the OTU frames accumulated in the delay adjustment memories 131-1 and 131-2 (step S203).

The control unit 20a determines the transmission path along which the same signal is received earlier based on the information regarding the delay difference output from the delay difference detection unit 14 (step S204). The control unit 20a generates the memory connection instruction in accordance with the determination result and outputs the generated memory connection instruction to the memory connection control unit 19a.

For example, when the control unit 20a determines that the signal of the 0-system transmission path is received earlier than the signal of the 1-system transmission path, the control unit 20a generates the memory connection instruction including the instruction to connect the delay adjustment large-capacity memory 132 to the delay adjustment memory 131 accumulating the signal received from the 0-system transmission path, that is, the delay adjustment memory 131-1. Then, the control unit 20a outputs the generated memory connection instruction to the memory connection control unit 19a.

For example, when control unit 20a determines that the signal of the 1-system transmission path is received earlier than the signal of the 0-system transmission path, the control unit 20a generates the memory connection instruction including the instruction to connect the delay adjustment large-capacity memory 132 to the delay adjustment memory 131 accumulating the signal received from the 1-system transmission path, that is, the delay adjustment memory 131-2. Then, the control unit 20a outputs the generated memory connection instruction to the memory connection control unit 19a.

The memory connection control unit 19a connects the delay adjustment large-capacity memory 132 to the delay adjustment memory 131-1 or the delay adjustment memory 131-2 in response to the memory connection instruction output from the control unit 20a (step S205). For example, the memory connection control unit 19a connects the delay adjustment large-capacity memory 132 to the delay adjustment memory 131-1 when the memory connection instruction includes the instruction to connect the delay adjustment large-capacity memory 132 to the delay adjustment memory 131-1. For example, the memory connection control unit 19a connects the delay adjustment large-capacity memory 132 to the delay adjustment memory 131-2 when the memory connection instruction includes the instruction to connect the delay adjustment large-capacity memory 132 to the delay adjustment memory 131-2.

When the connection between the delay adjustment memory 131 and the delay adjustment large-capacity memory 132 is completed, the memory connection control unit 19a responds to the control unit 20a with the connection of the delay adjustment large-capacity memory 132. After receiving the response indicating the connection of the delay adjustment large-capacity memory 132, the control unit 20a generates a delay amount control instruction and outputs the generated delay amount control instruction to the delay adjustment control unit 133 (step S206).

The delay adjustment control unit 133 performs the delay adjustment, for example, by adjusting a reading speed of the memory in response to the delay amount control instruction output from the control unit 20a (step S207). The delay difference detection unit 14 determines whether it is detected that the delay difference has disappeared (step S208). When it is detected that the delay difference has disappeared (YES in step S208), the delay difference detection unit 14 notifies the control unit 20a that the delay difference has disappeared.

Conversely, when it is not detected that the delay difference has disappeared (NO in step S208), the delay difference detection unit 14 waits until it is detected that the delay difference has disappeared.

When the delay difference detection unit 14 notifies the control unit 20a that the delay difference has disappeared, the control unit 20a outputs an instruction to end the delay adjustment to the delay adjustment control unit 133. Thus, the delay adjustment control unit 133 ends the delay adjustment. After the delay difference has disappeared, the control unit 20a outputs a path selection instruction to the path selection unit 15. For example, the control unit 20a generates the path selection instruction including information indicating that the delay is less, that is, designating the transmission path in which the signal is received earlier, and outputs the generated path selection instruction to the path selection unit 15. When the delay difference detection unit 14 inputs failure information or the operator inputs failure information from an external communication device, the control unit 20a generates a path selection instruction including information designating a transmission path different from the transmission path indicated by the failure information and outputs the generated path selection instruction to the path selection unit 15.

The path selection unit 15 selects the path of the signal acquisition source in response to the path selection instruction (step S209). For example, when the path selection instruction includes information designating the 0-system transmission path and the connection to the path (the first path) of the 0-system transmission path is made at the time of acquisition of the path selection instruction, the path selection unit 15 selects the first path and does not perform an operation of switching the connection or the like. In this way, when the path designated by the path selection instruction is the same as the path connected at the time of acquisition of the path selection instruction, the path selection unit 15 does not switch the path.

Conversely, when the path selection instruction includes information designating the 0-system transmission path and the connection to the path (the second path) of the 1-system transmission path is made at the time of acquisition of the path selection instruction, the path selection unit 15 selects the first path and performs an operation of switching the connection destination from the second path to the first path. In this way, when the path designated by the path selection instruction differs from the path connected at the time of acquisition of the path selection instruction, the path selection unit 15 switches the path.

Through the foregoing processing, the OTU frames are output to the demapping unit 16 from the path to which the path selection unit 15 and the delay difference detection unit 14 are connected. The demapping unit 16 performs the OH termination processing on the OTU frames output from the path selection unit 15, and then decodes predetermined client signals (for example, 100 GE client signals) from the payloads (step S210). The demapping unit 16 outputs the decoded client signals to the transmission signal generation unit 17.

The transmission signal generation unit 17 performs the OH insertion processing on the client signals decoded by the demapping unit 16, and then generates transmission signals by converting the client signals into transmission electrical signals (step S211). The transmission signal generation unit 17 outputs the generated transmission signals.

The transmission unit 18 performs electrical-optical conversion on the transmission signals generated by the transmission signal generation unit 17, and then transmits the converted transmission signals to the outside of the transmission device 10 (step S212).

In the second embodiment, a specific example of a connection relation of the delay adjustment large-capacity memory 132 before and after the switching of the path will be described. Here, processing of connecting the delay adjustment large-capacity memory 132 before the switching of the path is the processing of steps S103 to S106 of FIG. 2. The processing of connecting the delay adjustment large-capacity memory 132 after the switching of the path is the processing of steps S201 to S206 of FIG. 6.

The following four patterns are assumed as connection relations of the delay adjustment large-capacity memory 132 before and after the switching of the path:

1) before switching: delay of the 0-system transmission path<delay of the 1-system transmission path→after switching: delay of the 0-system transmission path<delay of the 1-system transmission path;
2) before switching: delay of the 0-system transmission path>delay of the 1-system transmission path→after switching: delay of the 0-system transmission path>delay of the 1-system transmission path;
3) before switching: delay of the 0-system transmission path<delay of the 1-system transmission path→after switching: delay of the 0-system transmission path>delay of the 1-system transmission path; and
4) before switching: delay of the 0-system transmission path>delay of the 1-system transmission path→after switching: delay of the 0-system transmission path<delay of the 1-system transmission path.

An operation of connecting the delay adjustment large-capacity memory 132 in the foregoing four patterns will be described in detail.

First, the pattern 1) will be described. The pattern 1) corresponds to a case where it is determined in the processing of step S105 of FIG. 2 that the signal of the 0-system transmission path is received earlier than the signal of the 1-system transmission path and it is determined in the processing of step S204 of FIG. 6 that the signal of the 0-system transmission path is received earlier than the signal of the 1-system transmission path. In this case, the memory connection control unit 19a connects the delay adjustment large-capacity memory 132 to the delay adjustment memory 131-1 via the 0-system transmission path in which the delay is less in the processing of step S106. The memory connection control unit 19a reconnects the delay adjustment large-capacity memory 132 to the delay adjustment memory 131-1 via the 0-system transmission path in which the delay is less in the processing of step S205.

Subsequently, the pattern 2) will be described. The pattern 2) corresponds to a case where it is determined in the processing of step S105 of FIG. 2 that the signal of the 1-system transmission path is received earlier than the signal of the 0-system transmission path and it is determined in the processing of step S204 of FIG. 6 that the signal of the 1-system transmission path is received earlier than the signal of the 0-system transmission path. In this case, the memory connection control unit 19a connects the delay adjustment large-capacity memory 132 to the delay adjustment memory 131-2 via the 1-system transmission path in which the delay is less in the processing of step S106. The memory connection control unit 19a reconnects the delay adjustment large-capacity memory 132 to the delay adjustment memory 131-2 via the 1-system transmission path in which the delay is less in the processing of step S205.

Subsequently, the pattern 3) will be described. The pattern 3) corresponds to a case where it is determined in the processing of step S105 of FIG. 2 that the signal of the 0-system transmission path is received earlier than the signal of the 1-system transmission path and it is determined in the processing of step S204 of FIG. 6 that the signal of the 1-system transmission path is received earlier than the signal of the 0-system transmission path. In this case, the memory connection control unit 19a connects the delay adjustment large-capacity memory 132 to the delay adjustment memory 131-1 via the 0-system transmission path in which the delay is less in the processing of step S106. The memory connection control unit 19a connects the delay adjustment large-capacity memory 132 to the delay adjustment memory 131-2 via the 1-system transmission path in which the delay is less in the processing of step S205.

In this way, in the pattern 3), a switching destination of the delay adjustment large-capacity memory 132 is switched before and after the switching of the path. Thus, it is possible to inhibit the discard of the data due to overflow at the time of the delay adjustment of the transmission path in which the delay is less.

Subsequently, the pattern 4) will be described. The pattern 4) corresponds to a case where it is determined in the processing of step S105 of FIG. 2 that the signal of the 1-system transmission path is received earlier than the signal of the 0-system transmission path and it is determined in the processing of step S204 of FIG. 6 that the signal of the 0-system transmission path is received earlier than the signal of the 1-system transmission path. In this case, the memory connection control unit 19a connects the delay adjustment large-capacity memory 132 to the delay adjustment memory 131-2 via the 1-system transmission path in which the delay is less in the processing of step S106. The memory connection control unit 19a connects the delay adjustment large-capacity memory 132 to the delay adjustment memory 131-1 via the 0-system transmission path in which the delay is less in the processing of step S205.

In this way, in the pattern 4), a connection destination of the delay adjustment large-capacity memory 132 is switched before and after the switching of the path. Thus, it is possible to inhibit the discard of the data due to overflow at the time of the delay adjustment of the transmission path in which the delay is less.

In the transmission device 10a that has the foregoing configuration, it is possible to obtain similar advantages to the advantages of the first embodiment.

In the transmission device 10a, the connection between the delay adjustment memory 131 and the delay adjustment large-capacity memory 132 is disconnected until the predetermined timing passes after the path is switched as in the first embodiment. In the transmission device 10a, after the predetermined timing passes, the delay difference between the 0-system transmission path and the 1-system transmission path is calculated and the delay adjustment large-capacity memory 132 is reconnected to the delay adjustment memory 131 of the transmission path in which the delay is less. Thus, it is possible to inhibit the discard of the data due to the lack of the memory capacity.

Third Embodiment

A third embodiment is an embodiment when a control unit included in a transmission device is mounted in another system.

Figure 7:
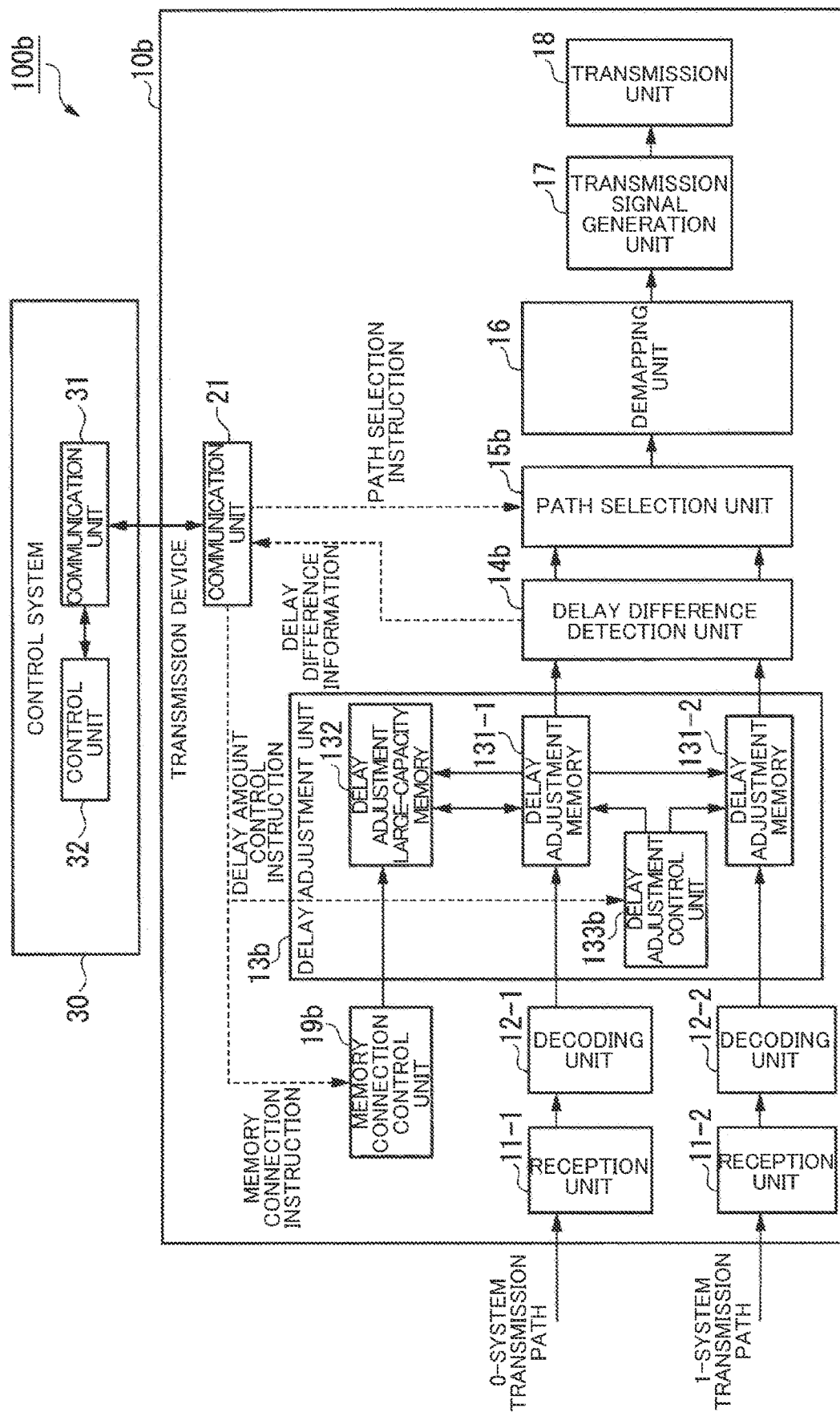
FIG. 7 is a diagram illustrating a system configuration of a transmission system according to a third embodiment.

FIG. 7 is a diagram illustrating a system configuration of a transmission system 100b according to the third embodiment. The transmission system 100b includes a transmission device 10b and a control system 30. Communication between the transmission device 10b and the control system 30 may be wired communication or may be wireless communication.

The transmission device 10b receives a plurality of signals transmitted from a transmission side transmission device via each of the 0-system transmission path and the 1-system transmission path and transmits the signals received via any transmission path among the plurality of received signals to another device. The transmission device 10*b* performs connection of a delay adjustment large-capacity memory, delay adjustment, and path selection in response to instructions from the control system 30.

The control system 30 controls the transmission device 10*b* by giving instructions to perform connection of the delay adjustment large-capacity memory, delay adjustment, and path selection to the transmission device 10*b* based on information obtained from the transmission device 10*b*. The control system 30 is provided in, for example, a location different from the location in which the transmission device 10*b* is provided and a location where there is an operator.

Next, specific configurations of the transmission device 10*b* and the control system 30 will be described.

The transmission device 10*b* includes the reception units 11-1 and 11-2, the decoding units 12-1 and 12-2, a delay adjustment unit 13*b*, a delay difference detection unit 14*b*, a path selection unit 15*b*, the demapping unit 16, the transmission signal generation unit 17, the transmission unit 18, a memory connection control unit 19*b*, and a communication unit 21.

The transmission device 10*b* has a configuration different from the transmission device 10 in that the delay adjustment unit 13*b*, the delay difference detection unit 14*b*, the path selection unit 15*b*, and the memory connection control unit 19*b* are provided instead of the delay adjustment unit 13, the delay difference detection unit 14, the path selection unit 15, and the memory connection control unit 19, the control unit 20 is not provided, and the communication unit 21 is newly provided. The transmission device 10*b* is similar to the transmission device 10 in the other configuration. Therefore, the description of the entire transmission device 10*b* will be omitted and the delay adjustment unit 13*b*, the delay difference detection unit 14*b*, the path selection unit 15*b*, the memory connection control unit 19*b*, and the communication unit 21 will be described.

The communication unit 21 performs communication with the control system 30. The communication unit 21 transmits the delay difference information to the control system 30 and receives the memory connection instruction, the delay amount control instruction, and the path selection instruction from the control system 30.

The delay adjustment unit 13*b* performs a similar operation to the operation of the delay adjustment unit 13. The operation performed by the delay adjustment unit 13*b* is different from the operation performed by the delay adjustment unit 13 in that the delay adjustment unit 13*b* operates based on an instruction transmitted from the control system 30 rather than the instruction from the control unit 20.

The delay difference detection unit 14*b* performs a similar operation to the operation of the delay difference detection unit 14. The operation performed by the delay difference detection unit 14*b* is different from the operation performed by the delay difference detection unit 14 in that the delay difference information is not output to the control unit 20, but delay difference information is output to the control system 30 via the communication unit 21.

The path selection unit 15*b* performs a similar operation to the operation of the path selection unit 15. The operation performed by the path selection unit 15*b* is different from the operation performed by the path selection unit 15 in that the path selection unit 15*b* operates based on an instruction transmitted from the control system 30 rather than the instruction from the control unit 20.

The memory connection control unit 19*b* performs a similar operation to the operation of the memory connection control unit 19. The operation performed by the memory connection control unit 19*b* is different from the operation performed by the memory connection control unit 19 in that the memory connection control unit 19*b* operates based on an instruction transmitted from the control system 30 rather than the instruction from the control unit 20.

Next, a configuration of the control system 30 will be described.

The control system 30 includes a communication unit 31 and a control unit 32.

The communication unit 31 performs communication with the transmission device 10*b*.

The communication unit 31 receives the delay difference information from the transmission device 10*b* and transmits the memory connection instruction, the delay amount control instruction, and the path selection instruction to the transmission device 10*b*.

The control unit 32 controls the transmission device 10*b* based on the information obtained from the transmission device 10*b*. For example, the control unit 32 determines the transmission path along which the same signal is received earlier based on the delay difference information obtained from the transmission device 10*b*. That is, the control unit 32 determines the transmission path along which the signal is received earlier between the 0-system transmission path and the 1-system transmission path in the transmission device 10*b*.

For example, the control unit 32 generates the memory connection instruction based on the determination result in accordance with the delay difference information. For example, the control unit 32 generates the delay amount control instruction based on the delay difference information. For example, the control unit 32 generates the path selection instruction based on the delay difference information and the failure information indicating the failure of the path.

Figure 8:
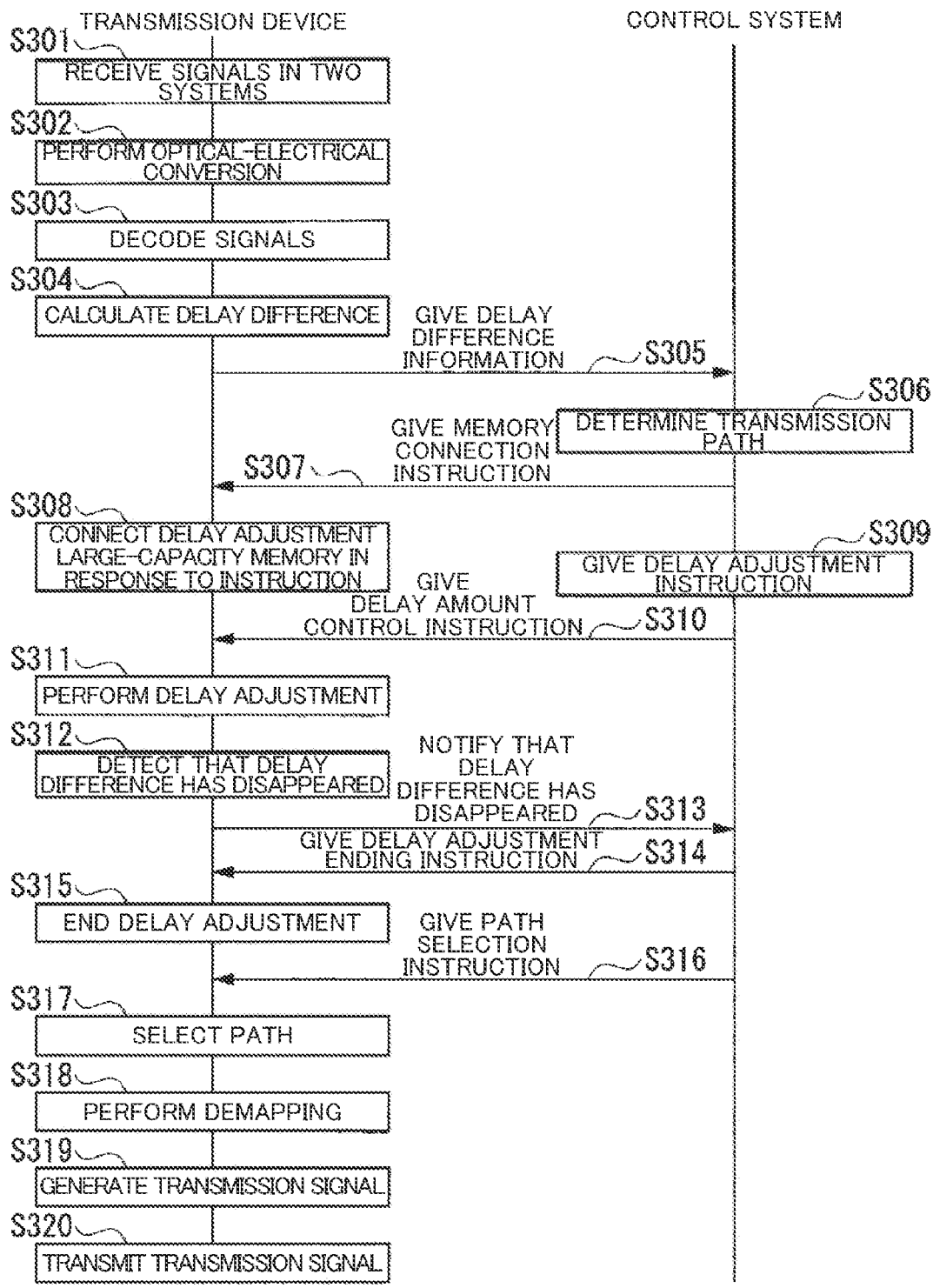
FIG. 8 is a sequence diagram illustrating a flow of processing of the transmission system according to the third embodiment.

FIG. 8 is a sequence diagram illustrating a flow of processing of the transmission system 100*b* according to the third embodiment. When the processing of FIG. 8 starts, the delay adjustment large-capacity memory 132 is assumed not to be connected to one of the delay adjustment memories 131-1 and 131-2.

The transmission device 10*b* receives signals in two systems (step S301). Specifically, the reception unit 11-1 receives a signal from the 0-system transmission path. The reception unit 11-2 receives a signal from the 1-system transmission path. The reception unit 11-1 performs optical-electrical conversion on the received signal and outputs the signal subjected to the optical-electrical conversion to the decoding unit 12-1. The reception unit 11-2 performs optical-electrical conversion on the received signal and outputs the signal subjected to the optical-electrical conversion to the decoding unit 12-2 (step S302).

The decoding unit 12-1 decodes the OTU frame from the received electrical signal. The decoding unit 12-1 establishes frame synchronization and then accumulates the decoded OTU frame to the delay adjustment memory 131-1. The decoding unit 12-2 decodes the OTU frame from the received electrical signal (step S303). The decoding unit 12-2 establishes frame synchronization and then accumulates the decoded OTU frame to the delay adjustment memory 131-2.

The delay difference detection unit 14*b* calculates a delay difference between the 0-system transmission path and the 1-system transmission path based on the OTU frames accumulated in the delay adjustment memories 131-1 and 131-2 (step S304). Because a method of calculating the delay difference is similar to the method of the first embodiment, the description will be omitted. The delay difference detection unit 14*b* outputs information regarding the calculated delay difference to the communication unit 21 and outputs the OTU frames to the path selection unit 15*b*.

The communication unit 21 transmits the information regarding the delay difference output from the delay difference detection unit 14*b* to the control system 30 (step S305).

The communication unit 31 of the control system 30 receives the information regarding the delay difference transmitted from the transmission device 10*b*. The communication unit 31 outputs the received information regarding the delay difference to the control unit 32. The control unit 32 determines the transmission path along which the same signal is received earlier based on the information regarding the delay difference output from the communication unit 31 (step S306). The control unit 32 generates a memory connection instruction in accordance with a determination result and outputs the generated memory connection instruction to the communication unit 31.

The communication unit 31 transmits the memory connection instruction output from the control unit 32 to the transmission device 10*b* (step S307).

The communication unit 21 of the transmission device 10*b* receives the memory connection instruction transmitted from the control system 30. The communication unit 21 outputs the received memory connection instruction to the memory connection control unit 19*b*.

The memory connection control unit 19*b* connects the delay adjustment large-capacity memory 132 to the delay adjustment memory 131-1 or the delay adjustment memory 131-2 in response to the memory connection instruction output from the communication unit 21 (step S308).

For example, the memory connection control unit 19*b* connects the delay adjustment large-capacity memory 132 to the delay adjustment memory 131-1 when the memory connection instruction includes the instruction to connect the delay adjustment large-capacity memory 132 to the delay adjustment memory 131-1. For example, the memory connection control unit 19*b* connects the delay adjustment large-capacity memory 132 to the delay adjustment memory 131-2 when the memory connection instruction includes the instruction to connect the delay adjustment large-capacity memory 132 to the delay adjustment memory 131-2.

When the connection between the delay adjustment memory 131 and the delay adjustment large-capacity memory 132 is completed, the memory connection control unit 19*b* generates a response indicating the connection of the delay adjustment large-capacity memory 132 and transmits the response to the control system 30 via the communication unit 21.

The communication unit 31 of the control system 30 receives the response transmitted from the transmission device 10*b* and outputs the received response to the control unit 32. After receiving the response indicating the connection of the delay adjustment large-capacity memory 132, the control unit 32 generates a delay amount control instruction and outputs the generated delay amount control instruction to the communication unit 31 (step S309). The communication unit 31 transmits the delay amount control instruction output from the control unit 32 to the transmission device 10*b* (step S310).

The communication unit 21 of the transmission device 10*b* receives the delay amount control instruction transmitted from the control system 30. The communication unit 21 outputs the received delay amount control instruction to the delay adjustment control unit 133*b*.

The delay adjustment control unit 133*b* performs the delay adjustment, for example, by adjusting a reading speed of the memory in response to the delay amount control instruction output from the communication unit 21 (step S311). When it is detected that the delay difference has disappeared (step S312), the delay difference detection unit 14*b* generates a notification indicating that the delay difference has disappeared and outputs the generated notification to the communication unit 21. The communication unit 21 transmits the notification output from the delay difference detection unit 14*b* to the control system 30 (step S313).

The communication unit 31 of the control system 30 receives the notification transmitted from the transmission device 10*b*. The communication unit 31 outputs the received notification to the control unit 32. When it is detected that the delay difference has disappeared in the notification output from the communication unit 31, the control unit 32 generates a delay adjustment ending instruction including an instruction to end the delay adjustment. The control unit 32 outputs the generated delay adjustment ending instruction to the communication unit 31. The communication unit 31 transmits the delay adjustment ending instruction output from the control unit 32 to the transmission device 10*b* (step S314).

The communication unit 21 of the transmission device 10*b* receives the delay adjustment ending instruction transmitted from the control system 30. The communication unit 21 outputs the received delay adjustment ending instruction to the delay adjustment control unit 133*b*. Thus, the delay adjustment control unit 133*b* ends the delay adjustment (step S315).

The control unit 32 of the control system 30 generates the path selection instruction after the delay adjustment ending instruction is transmitted. For example, the control unit 32 generates the path selection instruction including information designating the transmission path along which the delay is less, that is, designating the transmission path in which the signal is received earlier and outputs the generated path selection instruction to the communication unit 31. The communication unit 31 transmits the path selection instruction output from the control unit 32 to the transmission device 10*b* (step S316).

The communication unit 21 of the transmission device 10*b* receives the path selection instruction transmitted from the control system 30. The communication unit 21 outputs the received path selection instruction to the path selection unit 15*b*. The path selection unit 15*b* selects the path of the signal acquisition source in response to the path selection instruction output from the communication unit 21 (step S317). For example, when the path selection instruction includes information designating the 0-system transmission path and the connection to the path (the first path) of the 0-system transmission path is made at the time of acquisition of the path selection instruction, the path selection unit 15*b* selects the first path and does not perform an operation of switching the connection or the like. In this way, when the path designated by the path selection instruction is the same as the path connected at the time of acquisition of the path selection instruction, the path selection unit 15*b* does not switch the path.

Conversely, when the path selection instruction includes information designating the 0-system transmission path and the connection to the path (the second path) of the 1-system transmission path is made at the time of acquisition of the path selection instruction, the path selection unit 15*b* selects the first path and performs an operation of switching the connection destination from the second path to the first path. In this way, when the path designated by the path selection instruction differs from the path connected at the time of acquisition of the path selection instruction, the path selection unit 15b switches the path.

Through the foregoing processing, the OTU frames are output to the demapping unit 16 from the path to which the path selection unit 15b and the delay difference detection unit 14b are connected. The demapping unit 16 performs the OH termination processing on the OTU frames output from the path selection unit 15, and then decodes predetermined client signals (for example, 100 GE client signals) from the payloads (step S318). The demapping unit 16 outputs the decoded client signals to the transmission signal generation unit 17.

The transmission signal generation unit 17 performs the OH insertion processing on the client signals decoded by the demapping unit 16, and then generates transmission signals by converting the client signals into transmission electrical signals (step S319). The transmission signal generation unit 17 outputs the generated transmission signals.

The transmission unit 18 performs electrical-optical conversion on the transmission signals generated by the transmission signal generation unit 17, and then transmits the converted transmission signals to the outside of the transmission device 10 (step S320).

In the transmission system 100b that has the foregoing configuration, it is possible to obtain similar advantages to the advantages of the first embodiment.

In the transmission system 100b, some of the functional units of the transmission device 10 in the first embodiment are mounted on another system. Thus, it is possible to further reduce the processing load on the transmission device 10b compared to the first embodiment.

Modification Examples

In the embodiment, the control system 30 is configured to control one transmission device 10b, but the control system 30 may be configured to control the plurality of transmission devices 10b.

Fourth Embodiment

A fourth embodiment is an embodiment in which a control unit included in a transmission device is mounted on another system and a problem is solved when connection is switched to the transmission path used before switching of the path (hereinafter referred to as "switching-back of the path") from a situation in which communication is performed via one transmission path between the 0-system transmission path and the 1-system transmission path after the switching of the path.

Figure 9:
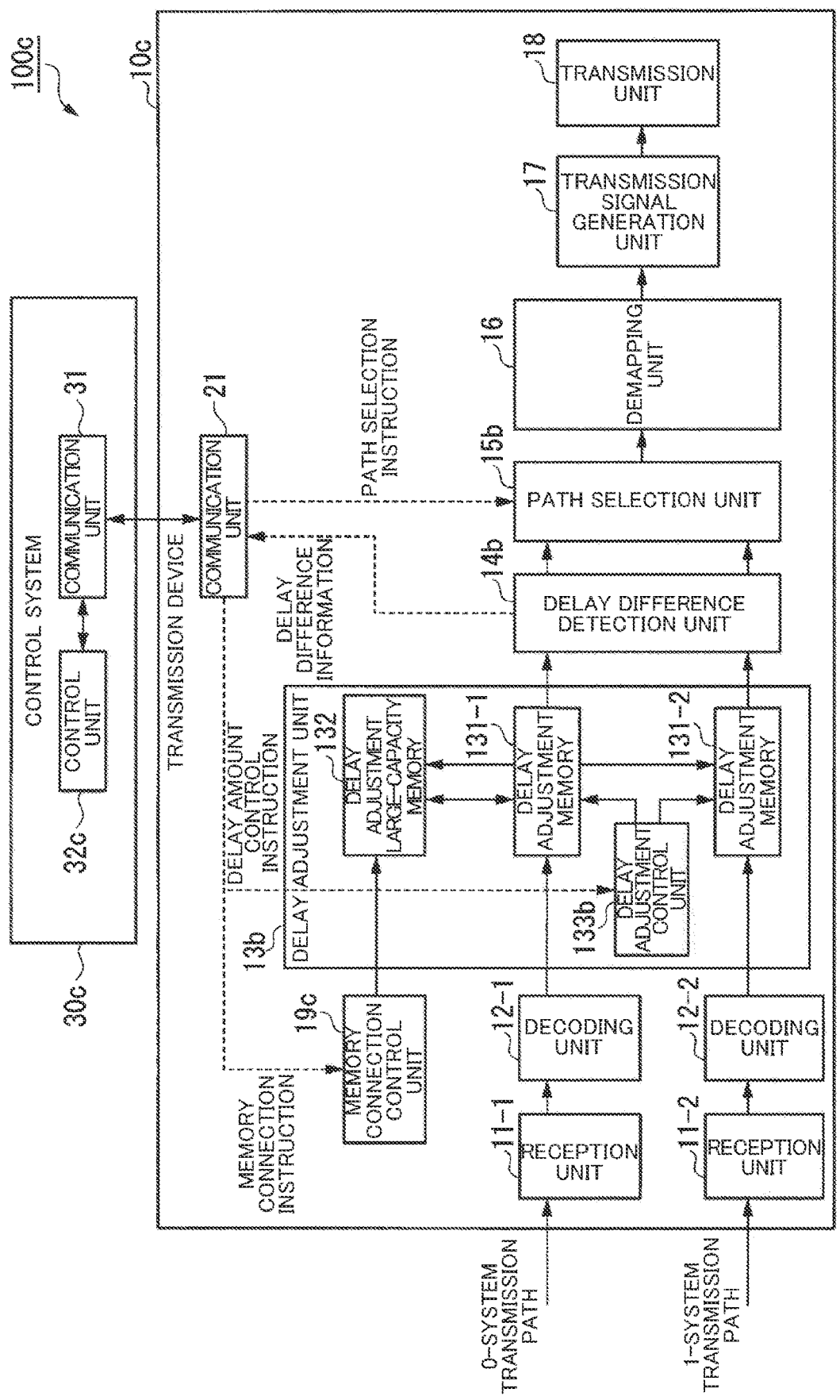
FIG. 9 is a diagram illustrating a system configuration of a transmission system according to a fourth embodiment.

FIG. 9 is a diagram illustrating a system configuration of a transmission system 100c according to the fourth embodiment. The transmission system 100c includes a transmission device 10c and a control system 30c.

The transmission device 10c performs processing similar to the processing of the transmission device 10b. The transmission device 10c performs the switching-back of the path at a predetermined timing after performing the path switching.

The control system 30c performs processing similar to the processing of the control system 30. The control system 30c instructs the transmission device 10c to perform the switching-back of the path at a predetermined timing after performing the path switching.

Next, specific configurations of the transmission device 10c and the control system 30c will be described.

The transmission device 10c includes the reception units 11-1 and 11-2, the decoding units 12-1 and 12-2, a delay adjustment unit 13b, a delay difference detection unit 14b, a path selection unit 15b, the demapping unit 16, the transmission signal generation unit 17, the transmission unit 18, and a memory connection control unit 19c.

The transmission device 10c has a configuration different from the transmission device 10b in that the memory connection control unit 19c is included instead of the memory connection control unit 19b. The transmission device 10c is similar to the transmission device 10b in the other configuration. Therefore, the description of the entire transmission device 10c will be omitted and the memory connection control unit 19c will be described.

The memory connection control unit 19c performs processing similar to the processing of the memory connection control unit 19b. The memory connection control unit 19c disconnects the connection of the delay adjustment large-capacity memory 132 connected to the delay adjustment memory 131 after the path switching is performed. Specifically, the memory connection control unit 19c physically disconnects the connection between the delay adjustment memory 131 and the delay adjustment large-capacity memory 132.

Next, a configuration of the control system 30c will be described.

The control system 30c includes a communication unit 31 and a control unit 32c.

The control unit 32c performs processing similar to the processing of the control unit 32. The control unit 32c transmits a memory connection instruction including an instruction to release the connection of the delay adjustment large-capacity memory 132 to the transmission device 10c via the communication unit 31 after the path switching is performed, that is, after the path is switched by the path selection unit 15. The control unit 20c transmits a path selection instruction including an instruction to connect to the path used before the switching to the transmission device 10c via the communication unit 31 after the delay difference disappears because of delay adjustment.

Figure 10:
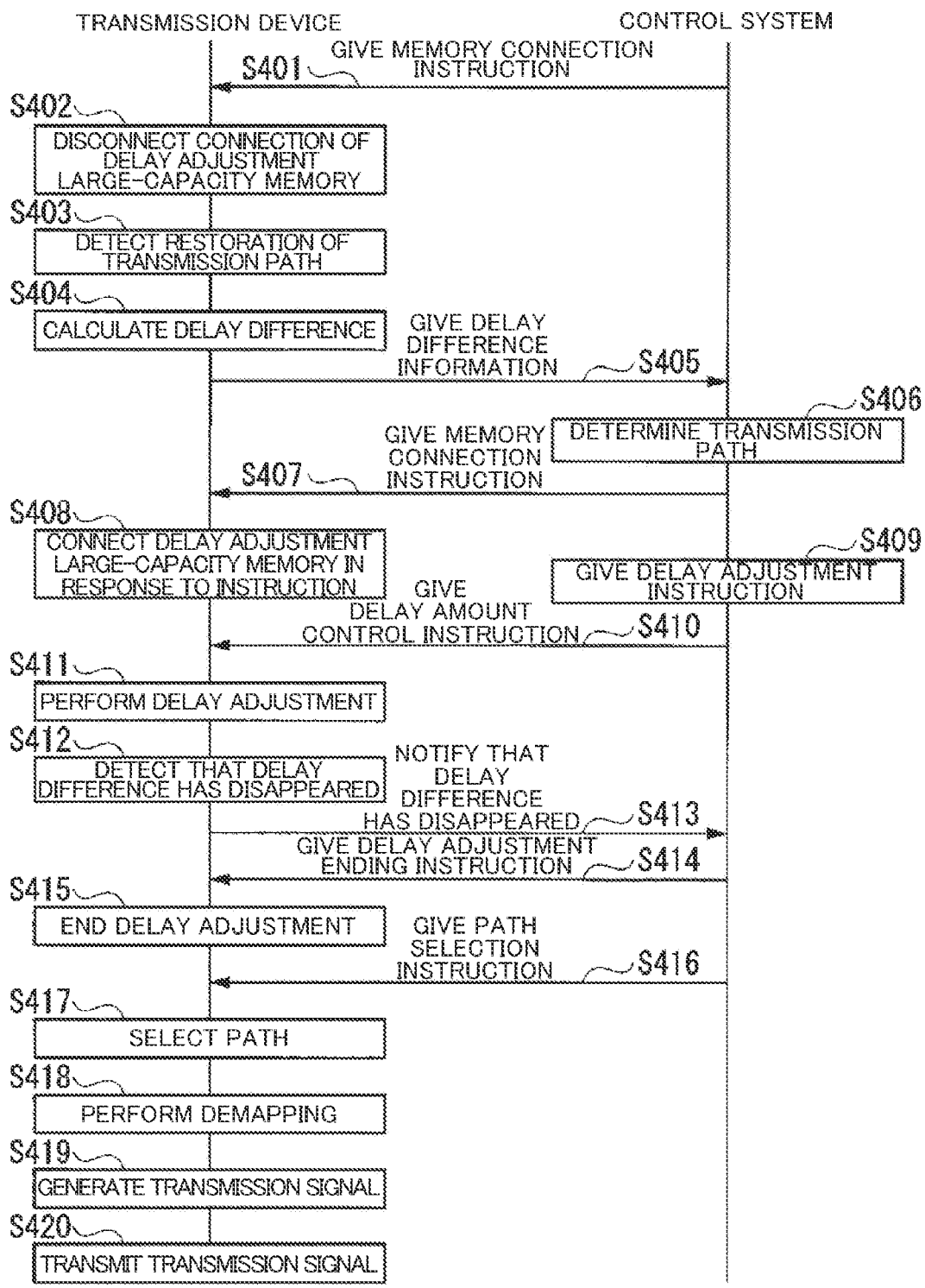
FIG. 10 is a sequence diagram illustrating a flow of processing of the transmission system according to the fourth embodiment.

FIG. 10 is a sequence diagram illustrating a flow of processing of the transmission system 100c according to the fourth embodiment. The processing of FIG. 10 is performed after the path selection unit 15 switches the path.

The control unit 32c of the control system 30c generates a memory connection instruction including an instruction to release the connection of the delay adjustment large-capacity memory 132 after the path switching is performed in the transmission device 10c. The control unit 32c outputs the generated memory connection instruction to the communication unit 31. The communication unit 31 transmits the memory connection instruction output from the control unit 32 to the transmission device 10c (step S401).

The communication unit 21 of the transmission device 10c receives the memory connection instruction transmitted from the control system 30c. The communication unit 21 outputs the received memory connection instruction to the memory connection control unit 19c. The memory connection control unit 19c disconnects the connection between the delay adjustment memory 131 and the delay adjustment large-capacity memory 132 in response to the memory connection instruction output from the communication unit 21 (step S402).

For example, the memory connection control unit 19c disconnects the connection between the delay adjustment memory 131-1 and the delay adjustment large-capacity memory 132 when the delay adjustment memory 131-1 and the delay adjustment large-capacity memory 132 are connected.

For example, the memory connection control unit 19c disconnects the connection between the delay adjustment memory 131-2 and the delay adjustment large-capacity memory 132 when the delay adjustment memory 131-2 and the delay adjustment large-capacity memory 132 are connected.

Thus, the delay adjustment large-capacity memory 132 is in a state in which the delay adjustment large-capacity memory 132 is not connected to one of the delay adjustment memories 131-1 and 131-2.

When the restoration of the transmission path is detected (step S403), the delay difference detection unit 14b calculates a delay difference between the 0-system transmission path and the 1-system transmission path based on the OTU frames accumulated in the delay adjustment memories 131-1 and 131-2 (step S404). Because a method of calculating the delay difference is similar to the method of the first embodiment, the description will be omitted. The delay difference detection unit 14b outputs the information regarding the calculated delay difference to the communication unit 21 and outputs the OTU frames to the path selection unit 15b.

The communication unit 21 transmits the information regarding the delay difference output from the delay difference detection unit 14b to the control system 30c (step S405).

The communication unit 31 of the control system 30c receives the information regarding the delay difference transmitted from the transmission device 10c. The communication unit 31 outputs the received information regarding the delay difference to the control unit 32c. The control unit 32c determines the transmission path along which the same signal is received earlier based on the information regarding the delay difference output from the communication unit 31 (step S406). The control unit 32c generates a memory connection instruction in accordance with a determination result and outputs the generated memory connection instruction to the communication unit 31.

The communication unit 31 transmits the memory connection instruction output from the control unit 32c to the transmission device 10c (step S407).

The communication unit 21 of the transmission device 10c receives the memory connection instruction transmitted from the control system 30c. The communication unit 21 outputs the received memory connection instruction to the memory connection control unit 19c. The memory connection control unit 19c connects the delay adjustment large-capacity memory 132 to the delay adjustment memory 131-1 or the delay adjustment memory 131-2 in response to the memory connection instruction output from the communication unit 21 (step S408).

When the connection between the delay adjustment memory 131 and the delay adjustment large-capacity memory 132 is completed, the memory connection control unit 19c generates a response indicating the connection of the delay adjustment large-capacity memory 132 and transmits the response to the control system 30c via the communication unit 21.

The communication unit 31 of the control system 30c receives the response transmitted from the transmission device 10c and outputs the received response to the control unit 32c. After receiving the response indicating the connection of the delay adjustment large-capacity memory 132, the control unit 32c generates a delay amount control instruction and outputs the generated delay amount control instruction to the communication unit 31 (step S409). The communication unit 31 transmits the delay amount control instruction output from the control unit 32c to the transmission device 10c (step S410).

The communication unit 21 of the transmission device 10c receives the delay amount control instruction transmitted from the control system 30c. The communication unit 21 outputs the received delay amount control instruction to the delay adjustment control unit 133b. The delay adjustment control unit 133b performs the delay adjustment, for example, by adjusting a reading speed of the memory in response to the delay amount control instruction output from the communication unit 21 (step S411). When it is detected that the delay difference has disappeared (step S412), the delay difference detection unit 14b generates a notification indicating that the delay difference has disappeared and outputs the generated notification to the communication unit 21. The communication unit 21 transmits the notification output from the delay difference detection unit 14b to the control system 30c (step S413).

The communication unit 31 of the control system 30c receives the notification transmitted from the transmission device 10c.

The communication unit 31 outputs the received notification to the control unit 32c. When it is detected that the delay difference has disappeared in the notification output from the communication unit 31, the control unit 32c generates a delay adjustment ending instruction including an instruction to end the delay adjustment. The control unit 32c outputs the generated delay adjustment ending instruction to the communication unit 31. The communication unit 31 transmits the delay adjustment ending instruction output from the control unit 32c to the transmission device 10c (step S414).

The communication unit 21 of the transmission device 10c receives the delay adjustment ending instruction transmitted from the control system 30c. The communication unit 21 outputs the received delay adjustment ending instruction to the delay adjustment control unit 133b. Thus, the delay adjustment control unit 133b ends the delay adjustment (step S415).

The control unit 32c of the control system 30c generates the path selection instruction after the delay adjustment ending instruction is transmitted. For example, the control unit 32c generates the path selection instruction including information designating the transmission path along which the delay is less, that is, designating the transmission path in which the signal is received earlier and outputs the generated path selection instruction to the communication unit 31. The communication unit 31 transmits the path selection instruction output from the control unit 32c to the transmission device 10b (step S416).

The communication unit 21 of the transmission device 10c receives the path selection instruction transmitted from the control system 30c. The communication unit 21 outputs the received path selection instruction to the path selection unit 15b. The path selection unit 15b selects the path of the signal acquisition source in response to the path selection instruction output from the communication unit 21 (step S417). For example, when the path selection instruction includes information designating the 0-system transmission path and the connection to the path (the first path) of the 0-system transmission path is made at the time of acquisition of the path selection instruction, the path selection unit 15b selects the first path and does not perform an operation of switching the connection or the like. In this way, when the path designated by the path selection instruction is the same as the path connected at the time of acquisition of the path selection instruction, the path selection unit 15*b* does not switch the path.

Conversely, when the path selection instruction includes information designating the 0-system transmission path and the connection to the path (the second path) of the 1-system transmission path is made at the time of acquisition of the path selection instruction, the path selection unit 15*b* selects the first path and performs an operation of switching the connection destination from the second path to the first path. In this way, when the path designated by the path selection instruction differs from the path connected at the time of acquisition of the path selection instruction, the path selection unit 15*b* switches the path.

Through the foregoing processing, the OTU frames are output to the demapping unit 16 from the path to which the path selection unit 15*b* and the delay difference detection unit 14*b* are connected. The demapping unit 16 performs the OH termination processing on the OTU frames output from the path selection unit 15, and then decodes predetermined client signals (for example, 100 GE client signals) from the payloads (step S418). The demapping unit 16 outputs the decoded client signals to the transmission signal generation unit 17.

The transmission signal generation unit 17 performs the OH insertion processing on the client signals decoded by the demapping unit 16, and then generates transmission signals by converting the client signals into transmission electrical signals (step S419). The transmission signal generation unit 17 outputs the generated transmission signals.

The transmission unit 18 performs electrical-optical conversion on the transmission signals generated by the transmission signal generation unit 17, and then transmits the converted transmission signals to the outside of the transmission device 10 (step S420).

In the transmission system 100*c* that has the foregoing configuration, it is possible to obtain similar advantages to the advantages of the second and third embodiments.

Modification Examples

In the embodiment, the control system 30*c* is configured to control one transmission device 10*c*, but the control system 30*c* may be configured to control the plurality of transmission devices 10*c*.

The transmission devices 10, 10*a*, 10*b*, and 10*c* and the control systems 30 and 30*c* according to the above-describe embodiments may be realized by computers. In this case, a program realizing the functions may be recorded on a computer-readable recording medium and the program recorded on the recording medium may be read and executed to be realized on a computer system. The "computer system" mentioned here includes an OS and hardware such as peripheral devices. The "computer-readable recording medium" is a portable medium such as a flexible disc, a magneto-optical disc, a ROM, or a CD-ROM or a storage device such as a hard disk embedded in the computer system.

Further, the "computer-readable recording medium" may include a medium that dynamically keeps a program in a short time, as in a communication line when a program is transmitted via a network such as the Internet or a communication circuit such as a telephone circuit and a medium that keeps a program for a given time as in an internal volatile memory of a computer system serving as a server or a client in this case. The program may be a program that realizes some of the above-described functions, a program that is combined with a program in which the above-described functions are recorded in advance in a computer system, or a program that is realized using a programmable logic device such as a field programmable gate array (FPGA).

The embodiments of the present invention have been described above in detail with reference to the drawings, but specific configurations are not limited to the embodiments, and design and the like are also included within the scope of the present invention without departing from the gist of the present invention.

REFERENCE SIGNS LIST

10, 10*a*, 10*b*, 10*c* transmission device
11-1, 11-2 reception unit
12-1, 12-2 decoding unit
13, 13*b* delay adjustment unit
131-1, 131-2 delay adjustment memory
132 delay adjustment large-capacity memory
133, 133*b* delay adjustment control unit
14, 14*b* delay difference detection unit
15, 15*b* path selection unit
16 demapping unit
17 transmission signal generation unit
18 transmission unit
19, 19*a*, 19*b*, 19*c* memory connection control unit
20, 20*a*, 20*b*, 20*c* control unit
21 communication unit
30, 30*c* control system
31 communication unit
32 control unit

The invention claimed is:

1. A transmission apparatus that performs communication with a transmission side transmission apparatus via a transmission path of an active system and a transmission path of a standby system, the transmission apparatus comprising:
a plurality of first memories configured to store a signal of the transmission path of an active system and a signal of the transmission path of a standby system, respectively,
a second memory configured to have a capacity that is as large as allowable delay caused due to a maximum path difference between the transmission path of the active system and the transmission path of the standby system;
a memory connection controller configured to switch connection so that the second memory is connected to one of the plurality of first memories and causes a signal of the transmission path of the active system or the transmission path of the standby system to accumulate in the second memory, and
a path selector configured to select a path of a signal acquisition source between the transmission path of the active system and the transmission path of the standby system,
wherein the memory connection controller disconnects the connection of the second memory while waiting for communication in one transmission path between the transmission path of the active system and the transmission path of the standby system and reconnects the second memory to accumulate a signal of the transmission path of the active system or the transmission path of the standby system in which delay is less after the communication is recovered, and wherein the path selector switches the path of the signal acquisition source to the selected path after the second memory is connected, wherein each of the memory connection controller and the path selector is implemented by:
i) computer executable instructions executed by at least one processor,
ii) at least one circuitry or
iii) a combination of computer executable instructions executed by at least one processor and at least one circuitry.

2. The transmission apparatus according to claim 1, wherein the memory connection controller causes a signal of the transmission path of the active system or the transmission path of the standby system in which delay is less to accumulate in the second memory.

3. A transmission system comprising: a transmission apparatus configured to perform communication with a transmission side transmission apparatus via a transmission path of an active system and a transmission path of a standby system; and a control system configured to control the transmission apparatus, wherein the transmission apparatus includes:
a plurality of first memories configured to store a signal of the transmission path of an active system and a signal of the transmission path of a standby system, respectively,
a second memory configured to have a capacity that is as large as allowable delay caused due to a maximum path difference between the transmission path of the active system and the transmission path of the standby system;
a memory connection controller configured to switch connection so that the second memory is connected to one of the plurality of first memories and causes a signal of the transmission path of the active system or the transmission path of the standby system to accumulate in the second memory, and
a path selector configured to select a path of a signal acquisition source between the transmission path of the active system and the transmission path of the standby system, and
wherein the control system includes a main controller that gives an instruction of a connection destination of the second memory to the memory connection controller,
wherein the memory connection controller disconnects the connection of the second memory while waiting for communication in one transmission path between the transmission path of the active system and the transmission path of the standby system and reconnects the second memory to accumulate a signal of the transmission path of the active system or the transmission path of the standby system in which delay is less after the communication is recovered, and wherein the path selector switches the path of the signal acquisition source to the selected path after the second memory is connected,
wherein each of the memory connection controller, the main controller and the path selector is implemented by:
i) computer executable instructions executed by at least one processor,
ii) at least one circuitry or
iii) a combination of computer executable instructions executed by at least one processor and at least one circuitry.

4. A delay adjustment method in a transmission apparatus that performs communication with a transmission side transmission apparatus via a transmission path of an active system and a transmission path of a standby system, the method comprising:
switching connection of a second memory that has a capacity that is as large as allowable delay caused due to a maximum path difference between the transmission path of the active system and the transmission path of the standby system to accumulate a signal of the transmission path of the active system or the transmission path of the standby system in the second memory,
selecting a path of a signal acquisition source between the transmission path of the active system and the transmission path of the standby system,
disconnecting the connection of the second memory while waiting for communication in one transmission path between the transmission path of the active system and the transmission path of the standby system and reconnects the second memory to accumulate a signal of the transmission path of the active system or the transmission path of the standby system in which delay is less after the communication is recovered, and
switching the path of the signal acquisition source to the selected path after the second memory is connected,
wherein the second memory is connected to one of a plurality of first memories configured to store a signal of the transmission path of an active system and a signal of the transmission path of a standby system, respectively.

* * * * *